(12) United States Patent
Knoblauch

(10) Patent No.: US 8,463,722 B2
(45) Date of Patent: Jun. 11, 2013

(54) IMPLEMENTING A NEURAL ASSOCIATIVE MEMORY BASED ON NON-LINEAR LEARNING OF DISCRETE SYNAPSES

(75) Inventor: Andreas Knoblauch, Seligenstadt (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 463 days.

(21) Appl. No.: 12/765,286

(22) Filed: Apr. 22, 2010

(65) Prior Publication Data

US 2010/0312735 A1    Dec. 9, 2010

(30) Foreign Application Priority Data

Jun. 4, 2009  (EP) .................................... 09161923
Dec. 15, 2009  (EP) .................................... 09179260

(51) Int. Cl.
*G06N 5/00*  (2006.01)
(52) U.S. Cl.
USPC .............................................. 706/25; 706/45
(58) Field of Classification Search
USPC .................................................. 706/25, 45
See application file for complete search history.

(56) References Cited

U.S. PATENT DOCUMENTS 5,469,161 A   11/1995   Bezek

FOREIGN PATENT DOCUMENTS

| EP | 2 012 260 A1 | 1/2009 |
| WO | 2007/019124 A2 | 2/2007 |

OTHER PUBLICATIONS

Lockery, Distributed Processing of Sensory Information in the Leech. III. A Dynamical Neural Network Model of the Local Bending Reflex, The Journal of Neuroscience, Oct. 1992, 12(10): pp. 3877-3895.*
Arnoldi, Synchronization Without Oscillatory Neurons, Technical Report, FKI-196-94, ISSN-0941-6358, Fakultät für Informatik Technische Universität München, 1994, pp. 1-22.*
Burks, Arthur W. et al., "Preliminary Discussion of the Logical Design of an Electronic Computing Instrument", U.S. Army Ordnance Department, 1946, pp. 1-45.
Dayan, P. et al., "Optimising Synaptic Learning Rules in Linear Associative Memories", Biological Cybernetics, 1991, pp. 253-265.
Golomb, Solomon W., "Run-Length Encodings", IEEE Transactions on Information Theory, 1965, pp. 399-401.
Hasler, Stephan et al., "A Comparison of Features in Parts-Based Object Recognition Hierarchies", ICANN 2007, pp. 210-219.
Palmer, Richard et al., "Introduction to the Theory of Neural Computation", Introduction, 1991, pp. 1-19.
Hopfield, J.J., "Neural Networks and Physical Systems with Emergent Collective Computational Abilities", Proceedings of the National Academy of Science, vol. 79 Apr. 1982, pp. 2554-2558.
Kanerva, Pentti, "Sparse Distributed Memory and Related Models", Feb. 2, 2002, pp. 1-41.
Kirstein, Stephan et al., "A Biologically Motivated Visual Memory Architecture for Online Learning of Objects", Neural Networks 21, 2008, pp. 65-77.

(Continued)

*Primary Examiner* — Wilbert L Starks
(74) *Attorney, Agent, or Firm* — Squire Sanders (US) LLP

(57) ABSTRACT

This invention is in the field of machine learning and neural associative memory. In particular the invention discloses a neural associative memory structure for storing and maintaining associations between memory address patterns and memory content patterns using a neural network, as well as methods for retrieving such associations. A method for a non-linear synaptic learning of discrete synapses is disclosed, and its application on neural networks is laid out.

40 Claims, 14 Drawing Sheets

OTHER PUBLICATIONS

Knoblauch, Andreas, "Optimal Matrix Compression Yields Storage Capacity 1 for Binary Willshaw Associative Memory", ICANN/ICONIP 2003, pp. 1-8.

Knoblauch, Andreas, "On Compressing the Memory Structures of Binary Neural Associative Networks", HRI-EU Report 06-02, pp. 1-49.

Knoblauch, Andreas, "Neural Associative Memory and the Willshaw-Palm Probability Distribution", SIAM Journal on Applied Mathematics 69, 2008, pp. 28.

Knoblauch, Andreas, "On Structural Plasticity in Neural Associative Networks", HRI-EU Report 08-04, pp. 1-55.

Knoblauch, A., "The Role of Structural Plasticity and Synaptic Consolidation for Memory and Amnesia in a Model of Cortico-Hippocampal Interplay", Connectionist Models of Behavior and Cognition II, 2008, pp. 1-12.

Knoblauch, Andreas et al., "Memory Capacities for Synaptic and Structural Plasticity", Neural Computation 22, 2009, pp. 289-341.

Kohonen, T., "Fast Adaptive Formation of Orthogonalizing Filters and Associative Memory in Recurrent Networks of Neuron-Like Elements", Biol. Cybernetics 21, 1976, pp. 85-95.

Lennie, Peter, "The Cost of Cortical Computation", Current Biology, vol. 13, Mar. 18, 2003, pp. 493-497.

Palm, G., "On Associative memory", Biological Cybernetics, 36, 1980, pp. 19-31.

Palm, G., "Cell Assemblies as a Guideline for Brain Research", Concepts in Neuroscience, vol. 1, No. 1, 1990, pp. 133-147.

Palm, Gunther et al., "Associative Data Storage and Retrieval in Neural Networks", Models of Neural Networks III, 1996, pp. 1-41.

Steinbuch, Von K., Die Lernmatrix, 1961, pp. 36-45.

Wersing, Heiko et al., "Learning Optimized Features for Hierarchical Models of Invariant Object Recognition", Neural Computation 15, 2003, pp. 1-27.

Willshaw, D.J. et al., "Non-Holographic Associative Memory", Nature, vol. 222, Jun. 7, 1969, pp. 960-962.

European Search Report application No. 09179260.6 dated Apr. 23, 2010.

Knoblauch, Andreas, "Synchronization and Pattern Separation in Spiking Associative Memories and Visual Cortical Areas", Oct. 1, 2003, pp. 1-179.

Knoblauch, Andreas, "Neural Associative Memory for Brain Modeling and Information Retrieval", vol. 95, No. 6, Sep. 30, 2005, pp. 537-544.

Sandberg, A. et al., "A Bayesian Attractor Network with Incremental Learning", Apr. 2002, pp. 179-194.

Sommer, Fredrich, et al., "Bayesian Retrieval in Associative Memories with Storage Errors", Jul. 1998, pp. 705-713.

Moopenn, A., et al., "Electronic Implementation of Associative Memory Based on Neural Network Models", Mar. 1987, pp. 325-331.

* cited by examiner (1) Learning associations between M pattern pairs, $u^\mu \rightarrow v^\mu$ $(u^1, v^1), (u^2, v^2), ..., (u^M, v^M) \rightarrow$ AM (2) Retrieving patterns
$\tilde{u} = u^{\mu_1} + \text{noise}$
$\downarrow$
AM $\rightarrow \hat{v} \; (\approx v^{\mu_1}!)$

| AM model | M [# memories] | C [bits/synapse] | $C^I$ [bits/computer bit] | $C^S$ [bits/relevant synapse] |
|---|---|---|---|---|
| Linear AM | asym. max. | asym. max. | near zero | low |
| Willshaw AM | low | low | low | low |
| Inhibitory WAM | low | low | maximal | maximal |
| Bayes AM | maximal | maximal | near zero | low |
| Zip AM | near max | near max | maximal | maximal |
Fig. 3
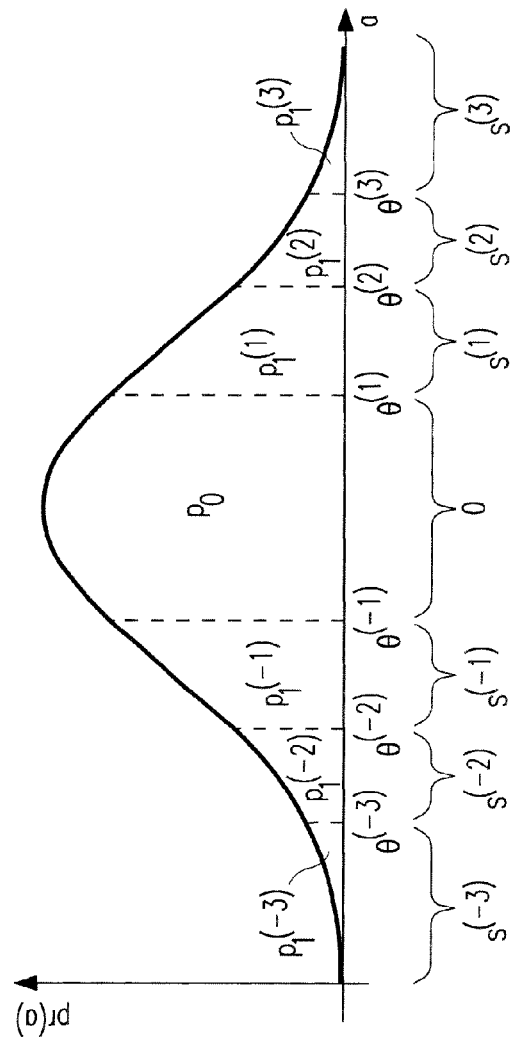
Fig. 5
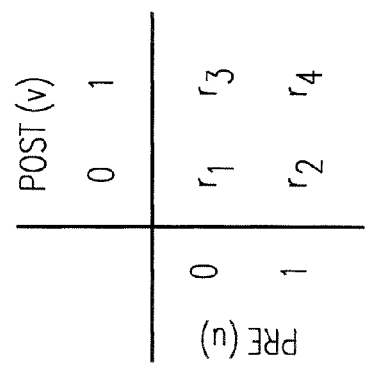
Fig. 4

| run-length | codeword m=2 | codeword m=4 | codeword m=8 |
|---|---|---|---|
| 0 | 00ɯ | 000ɯ | 0000ɯ |
| 1 | 01ɯ | 001ɯ | 0001ɯ |
| 2 | 100ɯ | 010ɯ | 0010ɯ |
| 3 | 101ɯ | 011ɯ | 0011ɯ |
| 4 | 1100ɯ | 1000ɯ | 0100ɯ |
| 5 | 1101ɯ | 1001ɯ | 0101ɯ |
| 6 | 11100ɯ | 1010ɯ | 0110ɯ |
| 7 | 11101ɯ | 1011ɯ | 0111ɯ |
| 8 | 111100ɯ | 11000ɯ | 10000ɯ |
| 9 | 111101ɯ | 11001ɯ | 10001ɯ |
| 10 | 1111100ɯ | 11010ɯ | 10010ɯ |

| N | #states | 1d(#states) | t | $p_1^{(t)}$ | $s^{(t)}$ | $p_1^{(-1)}$ | $s^{(-1)}$ | $p_0$ | $\zeta$ | $c_{max}$ |
|---|---|---|---|---|---|---|---|---|---|---|
| 1 | 3 | 1.59 | 1 | 0.2703 | 1 | 0.2703 | 1 | 0.4595 | 0.8098 | 0.5842 |
| 2 | 5 | 2.32 | 1 | 0.2445 | 0.4434 | 0.2444 | 0.4434 | 0.2978 | 0.9201 | 0.6637 |
|   |   |   | 2 | 0.1067 | 1 | 0.1067 | 0.9999 |   |   |   |
| 3 | 7 | 2.81 | 1 | 0.1987 | 0.2757 | 0.1986 | 0.2757 | 0.2207 | 0.9560 | 0.6896 |
|   |   |   | 2 | 0.1374 | 0.5834 | 0.1373 | 0.5834 |   |   |   |
|   |   |   | 3 | 0.0536 | 1 | 0.0536 | 0.9999 |   |   |   |
| 4 | 9 | 3.17 | 1 | 0.1643 | 0.1968 | 0.1644 | 0.1968 | 0.1756 | 0.9721 | 0.7013 |
|   |   |   | 2 | 0.1323 | 0.4075 | 0.1323 | 0.4075 |   |   |   |
|   |   |   | 3 | 0.0845 | 0.6548 | 0.0845 | 0.6548 |   |   |   |
|   |   |   | 4 | 0.0310 | 1 | 0.0310 | 1 |   |   |   |
| 5 | 11 | 3.46 | 1 | 0.1393 | 0.1514 | 0.1394 | 0.1514 | 0.1457 | 0.9808 | 0.7075 |
|   |   |   | 2 | 0.1206 | 0.3101 | 0.1205 | 0.3102 |   |   |   |
|   |   |   | 3 | 0.0916 | 0.4860 | 0.0916 | 0.4859 |   |   |   |
|   |   |   | 4 | 0.0558 | 0.6978 | 0.0558 | 0.6977 |   |   |   |
|   |   |   | 5 | 0.0198 | 1 | 0.0198 | 0.9999 |   |   |   |
| 6 | 13 | 3.70 | 1 | 0.1206 | 0.1223 | 0.1206 | 0.1223 | 0.1246 | 0.9859 | 0.7112 |
|   |   |   | 2 | 0.1088 | 0.2488 | 0.1088 | 0.2489 |   |   |   |
|   |   |   | 3 | 0.0901 | 0.3848 | 0.0900 | 0.3848 |   |   |   |
|   |   |   | 4 | 0.0659 | 0.5385 | 0.0658 | 0.5386 |   |   |   |
|   |   |   | 5 | 0.0389 | 0.7270 | 0.0389 | 0.7269 |   |   |   |
|   |   |   | 6 | 0.0134 | 1 | 0.0134 | 0.9999 |   |   |   |
| 7 | 15 | 3.91 | 1 | 0.1014 | 0.0959 | 0.1110 | 0.1058 | 0.1069 | 0.9892 | 0.7136 |
|   |   |   | 2 | 0.1022 | 0.2002 | 0.0986 | 0.2126 |   |   |   |
|   |   |   | 3 | 0.0854 | 0.3126 | 0.0839 | 0.3230 |   |   |   |
|   |   |   | 4 | 0.0707 | 0.4344 | 0.0672 | 0.4416 |   |   |   |
|   |   |   | 5 | 0.0486 | 0.5741 | 0.0486 | 0.5782 |   |   |   |
|   |   |   | 6 | 0.0282 | 0.7452 | 0.0284 | 0.7485 |   |   |   |
|   |   |   | 7 | 0.0094 | 0.9980 | 0.0096 | 1 |   |   |   |
| 8 | 17 | 4.09 | 1 | 0.0738 | 0.0620 | 0.1153 | 0.0950 | 0.0903 | 0.9913 | 0.7151 |
|   |   |   | 2 | 0.0775 | 0.1373 | 0.0895 | 0.1878 |   |   |   |
|   |   |   | 3 | 0.0842 | 0.2250 | 0.0918 | 0.2804 |   |   |   |
|   |   |   | 4 | 0.0617 | 0.3196 | 0.0729 | 0.3809 |   |   |   |
|   |   |   | 5 | 0.0491 | 0.4165 | 0.0549 | 0.4892 |   |   |   |
|   |   |   | 6 | 0.0377 | 0.5275 | 0.0410 | 0.6100 |   |   |   |
|   |   |   | 7 | 0.0227 | 0.6768 | 0.0225 | 0.7684 |   |   |   |
|   |   |   | 8 | 0.0080 | 0.8997 | 0.0070 | 1 |   |   |   |

Fig. 9

| #states | #bits | t | $p_i^{(t)}$ | $s^{(t)}$ | $\zeta$ | $c_{max}$ |
|---|---|---|---|---|---|---|
| 2 | 1 | 1 | 0.5 | 0 | 0.6366 | 0.4592 |
| | | 2 | 0.5 | 1 | | |
| 3 | 1.59 | 1 | 0.2702 | −1 | 0.8098 | 0.5842 |
| | | 2 | 0.4505 | 0 | | |
| | | 3 | 0.2703 | 1 | | |
| 4 | 2 | 1 | 0.1632 | −1 | 0.8825 | 0.6366 |
| | | 2 | 0.3369 | −0.4613 | | |
| | | 3 | 0.3369 | 0 | | |
| | | 4 | 0.1631 | 0.5387 | | |
| 5 | 2.32 | 1 | 0.1067 | −1 | 0.9201 | 0.6637 |
| | | 2 | 02445 | −0.4435 | | |
| | | 3 | 0.2978 | 0 | | |
| | | 4 | 0.2444 | 0.4434 | | |
| | | 5 | 0.1067 | 1 | | |
| 6 | 2.59 | 1 | 0.0740 | −0.7126 | 0.9420 | 0.6795 |
| | | 2 | 0.1810 | −0.3086 | | |
| | | 3 | 0.2450 | 0 | | |
| | | 4 | 0.2450 | 0.2874 | | |
| | | 5 | 0.1810 | 0.5959 | | |
| | | 6 | 0.0740 | 1 | | |
| 7 | 2.81 | 1 | 0.0613 | −1 | 0.9558 | 0.6895 |
| | | 2 | 0.1485 | −0.5849 | | |
| | | 3 | 0.2106 | −0.2748 | | |
| | | 4 | 0.2153 | 0 | | |
| | | 5 | 0.1909 | 0.2666 | | |
| | | 6 | 0.1246 | 0.5728 | | |
| | | 7 | 0.0488 | 0.9763 | | |
| 8 | 3 | 1 | 0.0434 | −0.8325 | 0.9652 | 0.6962 |
| | | 2 | 0.1149 | −0.4832 | | |
| | | 3 | 0.1790 | −0.2243 | | |
| | | 4 | 0.1944 | 0 | | |
| | | 5 | 0.1882 | 0.2105 | | |
| | | 6 | 0.1408 | 0.4154 | | |
| | | 7 | 0.1012 | 0.6559 | | |
| | | 8 | 0.0380 | 1 | | |

Fig. 10

| N | #states | #bits | t | $p_1(\pm t)$ | $s(\pm t)$ | $p_0$ | $\zeta$ | $C_{max}$ |
|---|---|---|---|---|---|---|---|---|
| 9 | 19 | 4.25 | 1 | 0.0856 | 0.0734 | 0.0829 | 0.9931 | 0.7164 |
|   |    |      | 2 | 0.0819 | 0.1516 |        |        |        |
|   |    |      | 3 | 0.0765 | 0.2326 |        |        |        |
|   |    |      | 4 | 0.0672 | 0.3182 |        |        |        |
|   |    |      | 5 | 0.0551 | 0.4108 |        |        |        |
|   |    |      | 6 | 0.0423 | 0.5136 |        |        |        |
|   |    |      | 7 | 0.0285 | 0.6316 |        |        |        |
|   |    |      | 8 | 0.0162 | 0.7792 |        |        |        |
|   |    |      | 9 | 0.0053 | 1      |        |        |        |
| 10 | 21 | 4.39 | 1 | 0.0771 | 0.0672 | 0.0793 | 0.9943 | 0.7173 |
|    |    |      | 2 | 0.0741 | 0.1345 |        |        |        |
|    |    |      | 3 | 0.0688 | 0.2037 |        |        |        |
|    |    |      | 4 | 0.0642 | 0.2765 |        |        |        |
|    |    |      | 5 | 0.0567 | 0.3562 |        |        |        |
|    |    |      | 6 | 0.0446 | 0.4422 |        |        |        |
|    |    |      | 7 | 0.0341 | 0.5365 |        |        |        |
|    |    |      | 8 | 0.0235 | 0.6474 |        |        |        |
|    |    |      | 9 | 0.0130 | 0.7891 |        |        |        |
|    |    |      | 10| 0.0042 | 1      |        |        |        |

Fig. 11

| N | #states | #bits | t | $p_1(\pm t)$ | $s(\pm t)$ | $p_0$ | $\zeta$ | $C_{max}$ |
|---|---|---|---|---|---|---|---|---|
| 1 | 3  | 1.59 | 1 | 0.2703 | 1      | 0.4595 | 0.8098 | 0.5842 |
| 2 | 5  | 2.32 | 1 | 0.2444 | 0.4434 | 0.2977 | 0.9201 | 0.6637 |
|   |    |      | 2 | 0.1067 | 1      |        |        |        |
| 3 | 7  | 2.81 | 1 | 0.1987 | 0.2757 | 0.2208 | 0.9560 | 0.6896 |
|   |    |      | 2 | 0.1373 | 0.5844 |        |        |        |
|   |    |      | 3 | 0.0536 | 1      |        |        |        |
| 4 | 9  | 3.17 | 1 | 0.1644 | 0.1968 | 0.1755 | 0.9721 | 0.7013 |
|   |    |      | 2 | 0.1323 | 0.4075 |        |        |        |
|   |    |      | 3 | 0.0845 | 0.6548 |        |        |        |
|   |    |      | 4 | 0.0311 | 1      |        |        |        |
| 5 | 11 | 3.46 | 1 | 0.1393 | 0.1515 | 0.1458 | 0.9808 | 0.7075 |
|   |    |      | 2 | 0.1207 | 0.3102 |        |        |        |
|   |    |      | 3 | 0.0916 | 0.4860 |        |        |        |
|   |    |      | 4 | 0.0558 | 0.6978 |        |        |        |
|   |    |      | 5 | 0.0197 | 1      |        |        |        |
| 6 | 13 | 3.7  | 1 | 0.1206 | 0.1224 | 0.1247 | 0.9859 | 0.7112 |
|   |    |      | 2 | 0.1088 | 0.2489 |        |        |        |
|   |    |      | 3 | 0.0900 | 0.3848 |        |        |        |
|   |    |      | 4 | 0.0659 | 0.5386 |        |        |        |
|   |    |      | 5 | 0.0389 | 0.7270 |        |        |        |
|   |    |      | 6 | 0.0134 | 1      |        |        |        |
| 7 | 15 | 3.91 | 1 | 0.1062 | 0.1022 | 0.1090 | 0.9893 | 0.7136 |
|   |    |      | 2 | 0.0983 | 0.2069 |        |        |        |
|   |    |      | 3 | 0.0855 | 0.3175 |        |        |        |
|   |    |      | 4 | 0.0687 | 0.4382 |        |        |        |
|   |    |      | 5 | 0.0490 | 0.5766 |        |        |        |
|   |    |      | 6 | 0.0283 | 0.7483 |        |        |        |
|   |    |      | 7 | 0.0096 | 1      |        |        |        |
| 8 | 17 | 4.09 | 1 | 0.0948 | 0.0874 | 0.0967 | 0.9915 | 0.7152 |
|   |    |      | 2 | 0.0892 | 0.1766 |        |        |        |
|   |    |      | 3 | 0.0802 | 0.2695 |        |        |        |
|   |    |      | 4 | 0.0681 | 0.3688 |        |        |        |
|   |    |      | 5 | 0.0535 | 0.4786 |        |        |        |
|   |    |      | 6 | 0.0375 | 0.6058 |        |        |        |
|   |    |      | 7 | 0.0213 | 0.7649 |        |        |        |
|   |    |      | 8 | 0.0071 | 1      |        |        |        |

| N | #states | #bits | $p_0$ | $\zeta$ | $C_{max}$ | #states | #bits | $p_0$ | $\zeta$ | $C_{max}$ |
|---|---|---|---|---|---|---|---|---|---|---|
|  |  |  |  |  |  | 2 | 1 | 0.5 | 0.6366 | 0.4592 |
| 1 | 3 | 1.59 | 0.4595 | 0.8098 | 0.5842 | 4 | 2 | 0.3369 | 0.8825 | 0.6366 |
| 2 | 5 | 2.32 | 0.2977 | 0.9201 | 0.6637 | 6 | 2.59 | 0.2450 | 0.9420 | 0.6795 |
| 3 | 7 | 2.81 | 0.2208 | 0.9560 | 0.6896 | 8 | 3 | 0.1944 | 0.9652 | 0.6962 |
| 4 | 9 | 3.17 | 0.1755 | 0.9721 | 0.7013 | 10 | 3.32 | 0.1798 | 0.9737 | 0.7024 |
| 7 | 15 | 3.91 | 0.1090 | 0.9893 | 0.7136 | 16 | 4 | 0.0729 | 0.9622 | 0.6941 |
| 8 | 17 | 4.09 | 0.0967 | 0.9915 | 0.7152 | 18 | 4.17 | 0.0576 | 0.9291 | 0.6702 |
| 15 | 31 | 4.95 | 0.0465 | 0.9972 | 0.7194 | 32 | 5 | 0.0313 | 0.9488 | 0.6855 |
| 16 | 33 | 5.04 | 0.0530 | 0.9976 | 0.7196 | 34 | 5.09 | 0.0295 | 0.9645 | 0.6957 |
| 31 | 63 | 5.98 | 0.0120 | 0.9985 | 0.7203 | 64 | 6 | 0.0156 | 0.9808 | 0.7075 |
| 32 | 65 | 6.02 | 0.0313 | 0.9988 | 0.7205 | 66 | 6.04 | 0.0152 | 0.9856 | 0.7110 |
| 63 | 127 | 6.99 | 0.0136 | 0.9996 | 0.7211 | 128 | 7 | 0.0078 | 0.9947 | 0.7175 |
| 64 | 129 | 7.01 | 0.0022 | 0.9997 | 0.7211 | 130 | 7.02 | 0.0077 | 0.9922 | 0.7157 |
| 127 | 255 | 7.99 | 0.0015 | 0.9998 | 0.7212 | 256 | 8 | 0.0039 | 0.9969 | 0.7191 |
| 128 | 257 | 8.01 | 0.0018 | 0.9996 | 0.7211 | 258 | 8.01 | 0.0039 | 0.9972 | 0.7193 |

| $p_1$ | #states > 0 | $\zeta_i/C/C^s$ | $p_1^i,...,N = p_1^{-1,...,N}$ and $s^{1,...,N} = s^{-1,...,N}$ |
|---|---|---|---|
| 0.5 | 1 | 0.6366/0.4592/0.9184 | $p_1(t) =$ 0.5000 |
| | | | $s(t) =$ 1.0000 |
| | 2 | 0.7596/0.5479/1.0958 | $p_1(t) =$ 0.3369 0.1631 |
| | | | $s(t) =$ 0.5418 1.0000 |
| | 4 | 0.8010/0.5778/1.1557 | $p_1(t) =$ 0.1917 0.1615 0.1066 0.0402 |
| | | | $s(t) =$ 0.3536 0.5268 0.7261 1.0000 |
| | 8 | 0.8136/0.5569/1.1737 | $p_1(t) =$ 0.1010 0.0995 0.0912 0.0769 0.0586 0.0409 0.0270 0.0079 |
| | | | $s(t) =$ 0.2613 0.3354 0.4132 0.4964 0.5859 0.6871 0.8133 1.0000 |
| | 16 | 0.8170/0.5894/1.1787 | $p_1(t) =$ 0.0522 0.0514 0.0491 0.0496 0.0465 0.0379 0.0490 0.0393 |
| | | | 0.0297 0.0306 0.0259 0.0181 0.0147 0.0095 0.0049 0.0014 |
| | | | $s(t) =$ 0.2123 0.2411 0.2701 0.3027 0.3364 0.3681 0.4044 0.4463 |
| | | | 0.4854 0.5264 0.5755 0.6284 0.6873 0.7608 0.8575 1.0000 |
| 0.1 | 1 | 0.3422/0.2468/2.4686 | $p_1(t) =$ 0.1000 |
| | | | $s(t) =$ 1.0000 |
| | 2 | 0.3536/0.2550/2.5504 | $p_1(t) =$ 0.0734 0.0266 |
| | | | $s(t) =$ 0.6963 1.0000 |
| | 4 | 0.3575/0.2579/2.5786 | $p_1(t) =$ 0.0452 0.0313 0.0176 0.0058 |
| | | | $s(t) =$ 0.5342 0.6470 0.7891 1.0000 |
| | 8 | 0.3587/0.2587/2.5873 | $p_1(t) =$ 0.0260 0.0218 0.0169 0.0138 0.0102 0.0066 0.0035 0.0011 |
| | | | $s(t) =$ 0.4398 0.4880 0.5389 0.5949 0.6606 0.7399 0.8428 1.0000 |
| | 16 | 0.3590/0.2590/2.5896 | $p_1(t) =$ 0.0109 0.0152 0.0096 0.0082 0.0118 0.0045 0.0099 0.0062 |
| | | | 0.0009 0.0055 0.0035 0.0029 0.0021 0.0018 0.0009 0.0002 |
| | | | $s(t) =$ 0.3835 0.4045 0.4268 0.4445 0.4676 0.4888 0.5109 0.5401 |
| | | | 0.5706 0.6080 0.6452 0.6823 0.7257 0.7832 0.8694 1.0000 |

| $p_1$ | #states > 0 | $\zeta_i/C/C^s$ | $p_1^i,...,N = p_1^{-1,...,N}$ and $s^{1,...,N} = s^{-1,...,N}$ |
|---|---|---|---|
| 0.05 | 1 | 0.2239/0.1615/3.2307 | $p_1(t) =$ 0.0500 |
| | | | $s(t) =$ 1.0000 |
| | 2 | 0.2285/0.1649/3.2972 | $p_1(t) =$ 0.0372 0.0128 |
| | | | $s(t) =$ 0.7411 1.0000 |
| | 4 | 0.2302/0.1660/3.3204 | $p_1(t) =$ 0.0232 0.0156 0.0085 0.0027 |
| | | | $s(t) =$ 0.5908 0.6880 0.8123 1.0000 |
| | 8 | 0.2306/0.1664/3.3275 | $p_1(t) =$ 0.0127 0.0118 0.0084 0.0075 0.0041 0.0033 0.0017 0.0005 |
| | | | $s(t) =$ 0.4995 0.5414 0.5871 0.6392 0.6978 0.7635 0.8559 1.0000 |
| | 16 | 0.2308/0.1665/3.3295 | $p_1(t) =$ 0.0025 0.0063 0.0045 0.0026 0.0062 0.0046 0.0042 0.0047 |
| | | | 0.0040 0.0035 0.0026 0.0017 0.0012 0.0008 0.0004 0.0001 |
| | | | $s(t) =$ 0.4420 0.4534 0.4685 0.4796 0.4946 0.5155 0.5356 0.5600 |
| | | | 0.5899 0.6244 0.6639 0.7051 0.7501 0.8056 0.8820 1.0000 |
| 0.01 | 1 | 0.0718/0.0518/5.1758 | $p_1(t) =$ 0.0100 |
| | | | $s(t) =$ 1.0000 |
| | 2 | 0.0724/0.0522/5.2221 | $p_1(t) =$ 0.0076 0.0024 |
| | | | $s(t) =$ 0.8113 1.0000 |
| | 4 | 0.0726/0.0524/5.2386 | $p_1(t) =$ 0.0048 0.0031 0.0016 0.0005 |
| | | | $s(t) =$ 0.6858 0.7593 0.8532 1.0000 |
| | 8 | 0.0727/0.0524/5.2436 | $p_1(t) =$ 0.0030 0.0019 0.0018 0.0013 0.0009 0.0006 0.0003 0.0001 |
| | | | $s(t) =$ 0.6023 0.6333 0.6655 0.7046 0.7501 0.8053 0.8904 1.0000 |
| | 16 | 0.0727/0.0524/5.2448 | $p_1(t) =$ 0.0011 0.0012 0.0013 0.0003 0.0012 0.0004 0.0007 0.0008 |
| | | | 0.0004 0.0001 0.0009 0.0006 0.0005 0.0003 0.0001 0.0000 |
| | | | $s(t) =$ 0.5659 0.5774 0.5918 0.6028 0.6133 0.6258 0.6361 0.6530 |
| | | | 0.6691 0.6765 0.6936 0.7271 0.7562 0.8196 0.8902 1.0000 |

Fig. 15

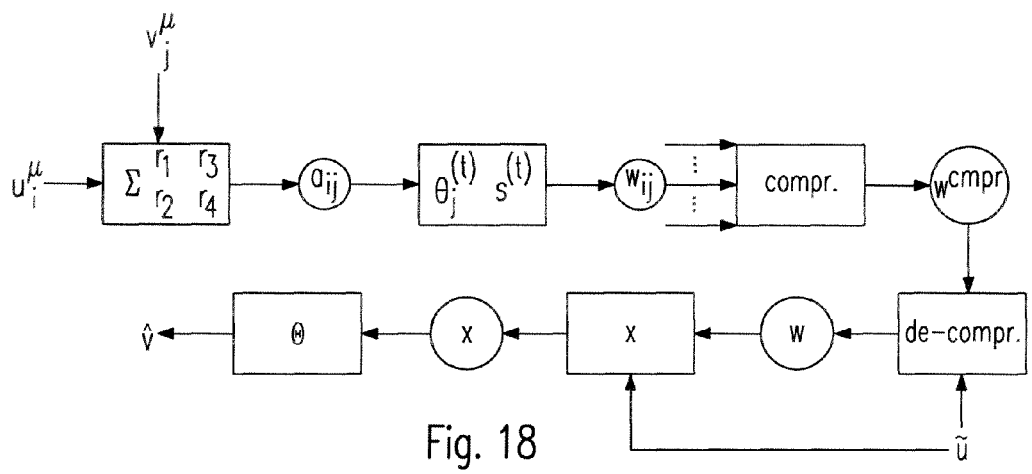
Fig. 18
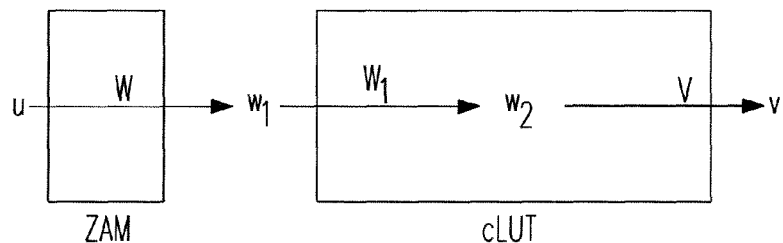
Fig. 19
(1) Learning
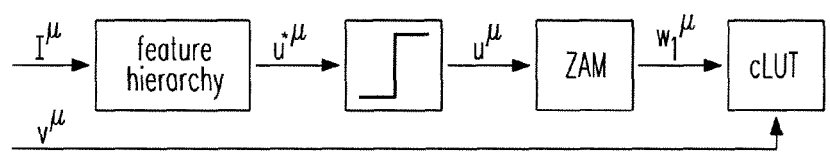
(2) Recognition
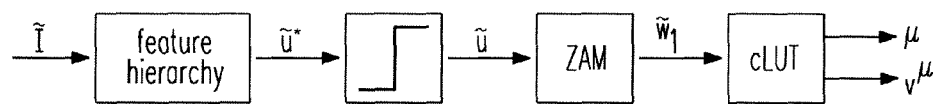
Fig. 20

IMPLEMENTING A NEURAL ASSOCIATIVE MEMORY BASED ON NON-LINEAR LEARNING OF DISCRETE SYNAPSES

This invention is in the field of machine learning and neural associative memory. In particular the invention discloses a neural associative memory structure for storing and maintaining associations between memory address patterns and memory content patterns using a neural network, as well as methods for retrieving such associations. A method for a non-linear synaptic learning of discrete synapses is disclosed and its application on neural networks is laid out.

The inventive neural associative memory structure can store associations between memory address patterns and memory content patterns in the neural network, i.e. in a network of neurons and synaptic connections, for example in a set of synaptic weights between the neutrons and also other properties and values of the neural network. Neural networks are applicable in all areas where pattern (and/or sequence) recognition is needed to identify a specific patterns, situations or to process information derived from observations made by machinery such as robots, autonomous vehicles or systems designed to assist a human operators—especially where the complexity of the data or a task renders an implementation of functions by hand impractical.

A neural network can generally be used to infer functions from observations as neural networks allow to work with no or only little a priori knowledge on the problem to be solved and also allows to provide for a failure tolerant behavior. Problems that may be addressed, may relate to system identification and control (vehicle control, process control), game-playing and decision making, machine vision and pattern recognition (facial recognition, object recognition, gesture recognition, speech recognition, (handwritten) character and text recognition), medical diagnosis, financial applications (automated trading systems), data mining (or knowledge discovery) and visualization.

Using the advantages of neural networks the neural associative memory structure accepts an input signal or input query pattern as a memory address pattern, which may be tainted with noise, and derives an output signal or output pattern that is identical or similar to the memory content pattern associated with the memory address pattern obtained from the input signal or input query pattern. The input signal or input query pattern may be accepted by one or more sensors, e.g. for visual or acoustic input. In the following, only the terms input query pattern and output pattern are used. The output pattern may be output through a software or hardware interface or may be transferred to another processing unit.

The invention combines the advantages of neural networks with new non-linear learning principles. Computations and transformations required by this combination as well those necessary for maintaining, adjusting and training the neural network may be performed by a processing means such as one or more processors (CPUs), signal processing units or other calculation, processing or computational hardware and/or software, which might also be adapted for parallel processing. All the processing and computations may be performed on standard off the shelf hardware or specially designed hardware components.

BACKGROUND OF THE INVENTION

In the classical von Neumann computing architecture, computation and data storage is performed by separate modules, the central processing unit and the random access memory, respectively (cf., e.g., A. N. Burks, H. H. Goldstine, and J. von Neumann. Preliminary discussion of the logical design of an electronic computing instrument. Report 1946, U.S. Army Ordonance Department, 1946) A memory address sent to the random access memory gives access to the data content of one particular storage location. Associative memories are computing architectures in which computation and data storage is not separated (cf., e.g., T. Kohonen. Associative memory: a system theoretic approach. Springer, Berlin, 1977). For example, an associative memory can store a set of associations between pairs of (binary) patterns $\{(u^\mu \to v^\mu): \mu=1, \ldots, M\}$ (see FIG. 1).

FIG. 1 illustrates a memory task: In the storage phase (upper part of FIG. 1), M. associations of memory address patterns $u^\mu$ and memory content patterns are stored in the associative memory device (AM). In the retrieval phase (lower part of FIG. 1), the AM is addressed with an input query pattern $\tilde{u}$ typically resembling one of the previously stored memory address patterns $u^{\mu_1}$. The AM returns the retrieval result $\hat{v}$ that should be similar to the associated memory content pattern $v^{\mu_1}$.

Similar as in random access memory, an input query pattern $u^\mu$ entered in the associative memory can serve as address for accessing the associated pattern $v^\mu$. However, the tasks performed by the two types of memory differ fundamentally. Random access is only defined for input query patterns that are valid addresses, that is, for the set of u patterns used during storage. The random access task consists of returning the data record at the addressed location (look-up).

In contrast, associative memories accept arbitrary nut query patterns $\tilde{u}$ and the computation of any particular output involves all stored data records rather than a single one. Specifically, the associative memory task consists of comparing an input query pattern $\tilde{u}$ with all stored addresses and returning an output pattern equal (or similar) to the pattern $v^\mu$ associated with the memory address pattern $u^\mu$ most similar to the input query pattern. Thus, the associative memory task includes the random access task but is not restricted to it. It also includes computations such as pattern completion, denoising or retrieval using incomplete cues.

Neural associative memories are parallel implementations of associative memory in a network of neurons in which associations are stored in a set of synaptic weights H between neurons typically employing fast Hebbian-type learning methods (cf., j. Hertz, A. Krogh, and R. G. Palmer. introduction to the theory of neural computation. Addison-Wesley, Redwood City, 1991), see FIG. 2. Neural associative networks are closely related to Hebbian cell assemblies (cf., e.g., G. Palm. Neural Assemblies. An Alternative Approach to Artificial Intelligence. Springer, Berlin, 1982) and play an important role in neuroscience as models of neural computation for various brain structures, in particular for neocortex, hippocampus, and cerebellum.

FIG. 2 illustrates a neuronal associative memory (NM considered by this invention. It is a two-layer neuronal network consisting of an address population u (size and a content population v (size All address neuron u; can make synaptic contacts with weight $w_{ij}$ onto content neuron $v_j$. When addressing with an input query pattern $\tilde{u}$, a content neuron $v_j$ gets active if the dendritic potential $x_j :=$ $$\sum_{i=1}^{m} w_{ij} \tilde{u}_i$$

exceeds the neuron's firing threshold $\Theta_j$. Memory associations are stored in the synaptic weights and firing thresholds of the network. FIG. 2 shows a hetero-associative memory.

For identical u and v the network becomes an auto-associative memory with recurrent synaptic connections.

STATE OF THE ART

Most previous realizations of two-layer neural associative memories can be assigned to one of the following three classes. The simplest model of neural associative memory is the so-called Steinbuch or Willshaw model with binary synapses and clipped Hebbian learning (cf., e.g., G. Palm and F. Sommer. Associative data storage and retrieval in neural nets. In E. Domany, J. L. van Hemmen, and K. Schulten, editors, Models of Neural Networks III, pages 79-118. Springer-Verlag, New York, 1996); K. Steinbuch. Die Lernmatrix. Kybernetik, 1:36-45, 1961; A. Knoblauch, G. Palm, and F. T. Sommer. Memory capacities for synaptic and structural plasticity. Neural Computation, 2009. accepted). Here a single coincidence of pre-synaptic and postsynaptic activity is sufficient to increase the synaptic weight from 0 to 1, while further coincidences do not cause further changes.

In contrast, for linear learning models as investigated by (cf., e.g., J. J. Hopfield. Neural networks and physical systems with emergent collective computational abilities. Proceedings of the National Academy of Science, USA, 79:2554-2558, 1982; P. Dayan and D. J. Willshaw. Optimising synaptic learning rules in linear associative memory. Biological Cybernetics, 65:253-265, 1991; G. Palm and F. Sommer. Associative data storage and retrieval in neural nets. In E. Domany, J. L. van Hemmen, and K. Schulten, editors, Models of Neural Networks III, pages 79-118. Springer-Verlag, New York, 1996) the contributions of each pattern pair add linearly. For binary patterns the general learning rule can be described by our values $\alpha$, $\beta$, $\gamma$, and $\delta$ specifying the weight increments for the pre-/post-synaptic activations 0/0, 0/1, 1/0, and 1/1.

Finally, a Bayesian associative memory model is actually the general optimal memory system if performance is measured only by network storage capacity C defined as stored Shannon information per synapse, or output noise $\epsilon$ defined as the normalized Hamming distance between retrieval output and original content pattern (cf., e.g., A. Knoblauch. Neural associative networks with optimal bayesian learning. HRI-EU Report. 09-02, Honda Research Institute Europe GmbH, D-63073 Offenbach/Main, Germany, May 2009). In particular, for finite sizes the Bayesian memory system can perform much better than both Willshaw and linear networks. Moreover, the Bayesian memory system is much more robust for "correlated" real-world memories violating the theoretical assumption of independently generated random patterns implicit in most previous works.

The three models (Willshaw, linear, Bayes) have almost the same asymptotic network storage capacity C as measured by the bits of information stored per synapse. The Willshaw model achieves 0.69 bits per synapse, however, only for very sparse memory patterns with a very low number k≈log n of active units. For k>>log n the network capacity C of the Willshaw model is near zero bits per synapse. In contrast, the linear and Bayesian models can store up to 0.72 bits per synapse for moderately sparse patterns and still about 0.33 bits per synapse for non-sparse patterns cf., e.g., A. Knoblauch. Neural associative networks with optimal bayesian learning. HRI-EU Report. 09-02, Honda Research Institute Europe GmbH, D-63073 Offenbach/Main, Germany, May 2009).

However, for implementations on digital computers It is more reasonable to evaluate performance by the information capacity $C^I$ defined by the stored Shannon information per bit of computer memory (see A. Knoblauch, G. Palm, and F. T. Sommer. Memory capacities for synaptic and structural plasticity. Neural Computation, 2009, accepted). Here the Willshaw model performs much better than the other two models because it employs binary synapses which can be realized with single memory bits. This is because the Willshaw model employs binary synapses which can be realized with single memory bits. Thus, the naive "uncompressed" Willshaw model can achieve an information capacity $C^I=C\leq 0.69$ equal to the network capacity C. In contrast, synapses in the linear and Bayesian models have gradual weights and usually must be implemented using floating point variables, e.g., employing 16 bit or 32 bit per synapse. Thus, for naive computer implementations, the information capacity $C^I$ of the linear and Bayesian models are near zero, whereas the synaptic capacity achieves similar values as $C\leq 0.72$.

In previous works (cf., e.g., A. Knoblauch. Optimal matrix compression yields storage capacity 1 for binary Willshaw associative memory. In O. Kaynak, E. Alpaydin, E. Oja, and L. Xu, editors, Artificial Neural Networks and Neural Information Processing—ICANN/ICONIP 2003., LNCS 2714, pages 325-332. Springer Verlag, Berlin, 2003; A. Knoblauch. Neural associative memory and the Willshaw-Palm probability distribution. SIAM Journal on Applied Mathematics, 69(1):169-196, 2008) it was shown that, for a large parameter range, the weight matrix of the Willshaw model can be optimally compressed by Golomb coding (cf., e.g., S. W. Golomb. Run-length encodings. IEEE Transactions on Information Theory, 12.399-401, 1966) such that, asymptotically, it is possible to store $C^I=1$ bit of information per computer bit. Correspondingly, a parallel VLSI parallel hardware implementation (and also the brain) can store up to $C^S=$ld n bits per synapse if the functionally irrelevant silent synapses are pruned. Such compression methods do not only minimize memory space but also retrieval time and energy requirements. Therefore such networks are used in a four-layer system for accelerating object recognition systems based on associative nearest neighbor search (cf., e.g., A. Knoblauch. On the computational benefits of inhibitory neural associative networks. HRI-EU Report 07-05, Honda Research Institute Europe GmbH, D-63073 Offenbach/Main, Germany, May 2007; A. Knoblauch. Best-match hashing with inhibitory associative networks for real-world object recognition. HRI-EU Report 08-05, Honda Research Institute Europe GmbH, 0-63073 Offenbach/Main, Germany, October 2008).

However, one serious limitation of the Willshaw model compared to the linear models is that the maximal number of memories that can be stored and retrieved at good quality (the so-called pattern capacity M) is relatively low unless the memory address patterns are sparse, k<<m. For example, if each address pattern has about k out of m and each content memory l out of n active units the theory shows that the linear and Bayesian models can store approximately M~mn/l memories while the Willshaw Model reaches only about M~mn/(kl). Thus, the pattern capacity of the Willshaw network is about factor k smaller than for the linear and Bayesian models.

The invention and a related technical report (cf. N. Knoblauch. Zip nets: Neural associative networks with nonlinear learning. Internal Report HRI-EU 09-03, Honda Research Institute Europe GmbH, D-63073 Offenbach/Main, Germany, June 2009) describe a novel associative memory model called zip net that combines the strengths of the Willshaw, Bayesian, and linear associative networks. Zip networks implement non-linear learning by applying thresholds on the synaptic weights obtained from either linear or Bayesian learning. The resulting discrete (binary, ternary, etc.) weight matrix then can be compressed similarly as for the Willshaw model. It turns out that such memory systems can achieve the high theoretical bounds $C \leq 0.72$, $C^I \leq 1$, $C^S \leq \ln n$ while maintaining the large pattern capacity $M \sim mn/l$ of the linear and Bayesian models. The performances of different models of neural associative memory are summarized by a table shown in FIG. 3.

The table of FIG. 3 shows a comparison of different associative memory (AM) models with respect to the following performance measures: The pattern capacity M measures the maximal number of stored memories. The network capacity C measures the maximal information a synapse can store in a structurally static network. The information capacity $C^I$ measures the maximally stored information per computer bit in a digitally compressed representation. Finally, the synaptic capacity $C^S$ measures the maximal information a synapse can store in a structurally plastic network assuming that irrelevant synapses can be pruned. The Linear AM achieves maximal N and C in the asymptotic limit of very large networks but only low $C^I$ and $C^S$. The (excitatory) Willshaw AM has always low performance unless the memories are extremely sparse. The Inhibitory WANT has low M and C but achieves maximal $C^I$ and $C^S$ even for moderate sparseness. The novel Bayes AM achieves maximal M and C even for finite networks but only low $C^I$ and $C^S$. The novel Zip AM achieves maximal or near maximal performance for all measures.

Actually, the two-layer memory models can be used as building blocks to implement larger systems with a more complex hierarchical structure. For example, some brain theories consider the brain as a complex network of interconnected associative memories (also see G. Palm. Neural Assemblies. An Alternative Approach to Artificial Intelligence. Springer, Berlin, 1982). For technical applications at least three layer networks are of interest because of well known limitations of two-layer networks (which cannot compute XOR functions, for example). One possible strategy is to map the memory address patterns $u^\mu$ into a high-dimensional space w and then associate the corresponding patterns $w^\mu$ with the content memories $v^\mu$. By this procedure different contents $v^{\mu_1}$ and $v^{\mu_2}$ can be associated with similar memory address patterns $u^{\mu_1} \approx u^{\mu_2}$, and, thus, the problems of storing "correlated" memories and storing memories with broadly distributed pattern activities (as described above) become tractable. For example, Kanerva (see P. Kanerva. Sparse Distributed Memory. MIT Press, Cambridge, Mass., 1988) describes a three layer system where, in the first stage, the address memories are de-correlated by a random projection. Similarly, in previous patent application EP 07 110 870, a four-layer memory system is described where the intermediary patterns are systematically chosen in order to minimize output noise. The current invention could be used, for example, in such multi-layer systems as building blocks, improving memory performance by replacing the previously employed Willshaw, Hopfield, or random networks.

The target of the invention hence is to disclose an efficient implementation of neural associative memory employing optimal non-linear learning methods and optimal threshold strategies.

SUMMARY OF THE INVENTION

This object is achieved by means of the features of the independent claims. The dependent claims develop further the central idea of the invention.

The invention therefore provides a neural associative memory structure for maintaining associations between memory address patterns and memory content patterns, the memory structure comprising a neural network consisting of a set of synapses and sets neurons, the synapses connecting neurons and storing the associations, an accepting means for accepting an input query pattern, a processing means for computing a matrix of synaptic potentials as a function of the memory address patterns and the memory content patterns,
    transforming the matrix of synaptic potentials into a matrix of synaptic weights, wherein each weight can be chosen from a finite set of synaptic strengths, optimizing the neural network with respect to a target architecture chosen for implementation, and computing for each neuron an optimal output function for minimizing output noise, and an output means for returning an output pattern to the input query pattern equal or similar to the memory content pattern associated with the memory address pattern equal or similar to the input query pattern.

The accepting means can be at least one of a sensor, a hardware interface and a software interface.

The processing means may be a processor and/or a signal processing unit formed of hardware and/or software.

The processing means can be adapted for parallel processing.

The output means can be at least one of a hardware interface, a software interface and an actor.

The neural network may be optimized by application of compression mechanisms.

The neural network can be optimized by skipping synapses with a predefined or zero weight in the optimization.

In another aspect of the invention the output noise can be defined the distance between the original content memory pattern and the output generated by the memory system, and parameters can be determined through the matrix of synaptic weights and a noise distribution describing how a query input pattern used for retrieval deviates from an original memory address pattern.

The synaptic potentials may be computed as a linear sum of learning increments.

The synaptic potentials can be computed corresponding to the weights of a Bayesian associative memory model.

Synaptic potentials can be transformed into synaptic weights by applying synaptic thresholds yielding discrete synaptic strengths, wherein the synaptic thresholds are computed to minimize the expected number of component errors in the retrieval output are computed.

The synaptic thresholds may be chosen such that each content neuron has the same set of matrix loads defined as an expected fraction of synapses with specified weights.

The synaptic thresholds can be adapted homeostatically such that, at any time, each neuron has the same number of synapses with a predetermined weight.

Discretization parameters may be chosen to maximize the signal-to-noise ratio and to maximize the number of storable patterns and/or stored information per synapse.

The neural network can be structurally static.

The discretization parameters may be obtained with respect to the synaptic strength and memory load.

The discretization parameters can be chosen to maximize the information capacity of the neural network, wherein the capacity can be defined as the stored information per computer bit.

The discretization parameters may be obtained with respect to the synaptic strength, the memory load, and information content of a discrete synaptic weight.

The discretization parameters can be chosen to maximize the synaptic capacity, wherein the synaptic capacity can be defined as the stored information per non-silent synapse.

The discretization parameters may be obtained with respect to the synaptic strength, the memory load and a total matrix load, wherein the total matrix load can be defined as the fraction of non-silent synapses.

The neural network may be a structurally plastic network.

For a set synapses a discrete synaptic weight matrix can be implemented by a set of binary matrices.

Moreover, synapses may have discrete weights, and each discrete weight can be calculated as a binary linear combination of values described by a binary bit vector.

Each entry of the binary matrices can be defined as a binary weight, which may be active if the discrete weight is a linear combination of predetermined factors, and wherein the factor corresponding to the binary matrix considered is active.

The invention also provides a method for retrieving a memory content pattern from the neural associative memory structure comprising the steps of accepting an input query pattern by an accepting means, using a neural network consisting of a set of synapses and a set of neurons, the synapses connecting neurons and storing the associations between memory address patterns and memory content patterns for retrieval of an output pattern, computing dendritic potentials from the input query pattern with a synaptic weight matrix by a processing means, computing an output pattern by a non-linear function of the dendritic potentials, parametrized by synaptic thresholds, and returning the output pattern to the input query pattern equal or similar to the memory content pattern associated with the memory address pattern equal or similar to the input query pattern through output means.

In another aspect of the invention, the processing means may be used for computing a matrix of synaptic potentials as a function of the memory address patterns and the memory content patterns, transforming the matrix of synaptic potentials into a matrix discrete synaptic weights, wherein each weight is chosen from a finite set of synaptic strength, optimizing the neural network with respect to a target architecture chosen for implementation, and computing for each neuron an optimal output function for minimizing the output noise.

The dendritic potentials can be computed by a matrix multiplication of the query input pattern with the synaptic weight. matrix, and the output. pattern may be computed by applying synaptic thresholds to the dendritic potentials, where the synaptic thresholds are optimized for minimizing the expected number of component errors in the output pattern if a binary input query pattern is provided.

The dendritic potentials may also be computed by a matrix multiplication of the input query pattern with the synaptic weight matrix, wherein a vector of synaptic thresholds can be subtracted, if parameters are such that not all resulting synaptic thresholds are zero or near zero, wherein the dendritic potentials can be normalized, and wherein the neurons with the largest dendritic potentials can be activated.

The dendritic potentials can be computed for discrete synapses from the synaptic strength, matrices and the input query pattern.

The matrix multiplications can he performed bit-parallel.

The matrix multiplications can be efficiently parallelized, such that in each computation step several synapses may be processed in parallel.

In another aspect, the invention provides a neural network structure used in the neural associative memory structure, wherein the neural network consisting of a set o synapses and a set of neurons, the synapses connecting neurons and storing the associations between memory address patterns and memory content patterns can be implemented on a parallel computational architecture with at least two processors, the processors being connected by a common bus.

Each processor may store a column of a discrete synaptic weight matrix in its local memory, wherein active components of the input query patterns accepted by an accepting means are presented one after the other on the common bus to neurons implemented by the processors, and wherein the processors may add up corresponding synaptic weights in parallel, such that a retrieval requires only as many time steps as the number of neurons active for the input query pattern.

The architecture may be a matrix like architecture, and the neurons may instantaneously add synaptic inputs such that retrieval takes only a single time step.

BRIEF DESCRIPTION OF THE DRAWINGS

FIG. 3 shows a comparison table of different associative memory (AM) models.

FIG. 4 shows a specification of the learning rule.

FIG. 5 exemplarily illustrates a discretization of synaptic strengths.

FIG. 9 shows a table for optimal parameter sets for zip nets with discrete synapses.

FIG. 10 shows another table for optimal parameter sets for zip nets with discrete synapses.

FIG. 11 shows yet another table for optimal parameter sets for zip nets with discrete synapses.

FIG. 12 shows a further table for optimal parameter sets for zip nets with discrete synapses.

FIG. 13 shows a table for optimal parameter sets $p_1^{(t)}$, $s^{(t)}$ for the odd state number applying symmetric default parameters.

FIG. 14 shows a table for optimal parameter sets $p_1^{(t)}$, $s^{(t)}$ and corresponding zip variable $\zeta$, network capacity $C$ and synaptic capacity $C^S$ under the constraint of a constant small total matrix load $p_1$.

FIG. 15 shows a table for optimal parameter sets $p_1^{(t)}$, $s^{(t)}$ and corresponding zip variable $\zeta$, network capacity $C$ and synaptic capacity $C^S$ under the constraint of positive synaptic strengths and a constant small total matrix load $p_1$.

FIG. 18 illustrates a processing flow of the zip network.

FIG. 19 pictures a four-layer system for information retrieval.

FIG. 20 shows a block diagram of a system for object recognition using a Zip Associative Memory.

DETAILED DESCRIPTION OF THE INVENTION

Figures 1, 2:
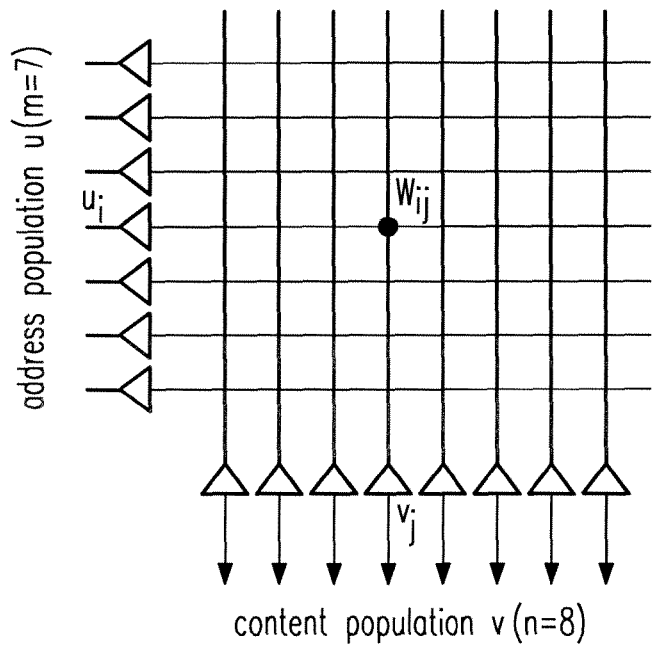
FIG. 1 illustrates a storage phase and a retrieval phase of a memory task.
FIG. 2 illustrates a neuronal associative memory (NAM).

Neural associative memory networks as considered by this invention are single layer neural networks or perceptrons with fast, typically "one-shot" learning corresponding to the storage of M discrete associations between pairs of binary pattern vectors $\{(u^\mu \to v^\mu):\mu=1, \ldots, M\}$. Here is the $\mu$-th memory address pattern being a binary vector of size m. Similarly, $v^\mu$ is the $\mu$-th memory content pattern being a binary vector of size n. Further the pattern activities $$k^\mu := \sum_{i=1}^{m} u_i^\mu \text{ and } l^\mu := \sum_{j=1}^{n} v_j^\mu$$

are defined as the number of one-entries in the $\mu$-th memory address and memory content pattern, respectively. Finally, $k:=E_\mu(k^\mu)$ and $1:=E_\mu(1^\mu)$ denote the average pattern activities.

The "one-shot" constraint restricts the set of possible learning methods. For example, gradient descent methods (as error-backpropagation) are not viable because they require repeated training of the whole pattern set. Instead it is straight-forward to use simple Hebbian-like learning rules:

If, during presentation of a single pattern pair, both the presynaptic and postsynaptic neurons are active then the synaptic weight must be increased.

A commonly employed performance measure for neural associative memories is the network storage capacity C evaluation the stored information bits per synapse, $$C := \frac{\text{stored information}}{\text{\# synaptic contacts}} \text{[bit/contact]}$$

A related performance measure is the output noise defined as the expected Hamming distance $$d_H(v^\mu, \hat{v}) := \sum_{j=1}^{n} (v_j^\mu - \hat{v}_j^\mu)^2$$

between retrieval result $\hat{v}$ and original memory content pattern $v^\mu$ normalized by the mean memory content pattern activity l, $$\epsilon := \frac{d_H(\hat{v}, v^\mu)}{1}. \quad (1)$$

Thus, one possible goal pursued in many previous approaches was to maximize C and minimize $\epsilon$. The related patent application mentioned above describes the implementation of an optimal associative memory that can indeed achieve maximal C and minimal $\epsilon$.

However, in another document (see A. Knoblauch, G. Palm, and F. T. Sommer. Memory capacities for synaptic and structural plasticity. Neural Computation, 2009. accepted) it is argued that, for implementations on digital computers, it may be more desirable to maximize the stored information per computer bit, This leads to the definition of information capacity $C^I$, $$C^I := \frac{\text{stored information}}{\text{\# bits of required computer memory}} \text{[bit/bit]},$$

which can behave quite differently than C if the synaptic weights $w_{ij}$ have low entropy, e.g., if the synapses assume weights from a small set of discrete values. A further related measure interesting for VLSI hardware implementations is the synaptic capacity $C^S$, which normalizes the stored information to the number of relevant non-silent synapses, $$C^S := \frac{\text{stored information}}{\text{\# non-silent synapses}} \text{[bit/synapse]}.$$

Here the idea is that silent synapses (with zero weight) are actually functionally irrelevant and can simply be skipped. This is particularly important for VLSI parallel hardware implementations where costs are usually determined by the number of physical connections. Similar is true for the brain where the irrelevant synapses could be pruned by structural processes (see, e.g., A. Knoblauch. The role of structural plasticity and synaptic consolidation for memory and amnesia in a model of cortico-hippocampal interplay. In J. Mayor, N. Ruh, and K. Plunkett, editors, Connectionist Models of Behavior and Cognition II: Proceedings of the 11th Neural Computation and Psychology Workshop, pages 79-90, Singapore, 2009. World Scientific Publishing).

In contrast to previous solutions, the target of the current invention is to build a memory system that can achieve high capacities C, $C^I$, and $C^S$ at low output noise levels $\epsilon$. As shown below, this becomes possible for a non-linear learning procedure resulting in discrete synaptic weights.

Memory Storage with Discrete Synapses

The task is to store M associations between memory address patterns and memory content patterns $v^\mu$ where $\mu=1 \ldots M$. It may be assumed that all memory patterns are binary vectors. Memory address patterns $u^\mu$ have dimension m and memory content patterns $v^\mu$ dimension n. Information about the memory patterns are stored in the discrete synaptic weights $w_{ij}$ by non-linear learning. More specifically, the weight $w_{ij}$ of a synapse from address neuron i to content neuron j results from applying synaptic thresholds $\theta_j^{(t)}$ to the synaptic potential $a_{ij}$ obtained linear summing the learning increments $R(u_1^\mu, v_1^\mu)$. Here the synaptic potentials $a_{ij}$ compute as follows, $$a_{ij} = \sum_{\mu=1}^{M} R(u_i^\mu, v_j^\mu).$$

Since the memory patterns are binary the linear learning of the synaptic potentials can be described by four values $r_1:=R(0,0)$, $r_2:=R(1,0)$, $r_3:=R(0,1)$, and $r_4:=R(1,1)$ as illustrated by FIG. 4.

FIG. 4 shows a specification of the learning rule R by four values $r_1:=R(0,0)$, $r_2:=R(1,0)$, $r_3:=R(0,1)$, and $r_4:=R(1,1)$.

For a discretization with an odd number of 2N+1=3, 5, 7, ... weight values $s^{(t)}$, the synaptic weights $w_{ij}$ are given by $$w_{ij} = \begin{cases} s^{(N)} & , a_{ij} \geq \theta_j^{(N)} \\ s^{(N-1)} & , \theta_j^{(N)} > a_{ij} \geq \theta_j^{(N-1)} \\ s^{(N-2)} & , \theta_j^{(N-1)} > a_{ij} \geq \theta_j^{(N-2)} \\ \ldots \\ -s^{(-N+2)} & , \theta_j^{(-N+1)} < a_{ij} \leq \theta_j^{(-N+2)} \\ -s^{(-N+1)} & , \theta_j^{(-N)} < a_{ij} \leq \theta_j^{(-N+1)} \\ -s^{(-N)} & , a_{ij} \leq \theta_j^{(-N)} \\ 0 & , \text{otherwise} \end{cases} \quad (2)$$

where the $s^{(t)}$ are non-negative numbers for $t=\pm 1, \pm 2, \ldots, \pm N$ specifying the synaptic strengths or weights. For a discretization with an even number of $2N=2, 4, 6, \ldots$ weight values can be set, for example $\theta_j^{(-N)}=-\infty$.

For a given set of synaptic thresholds $\theta_j^{(t)}$ with $t=\pm 1, \pm 2, \ldots, \pm N$ and a given distribution of synaptic potentials $a_{ij}$ a fraction $p_1^{(t)}$ of the neuron's synapses will assume weight $s^{(t)}$ (for $t>0$) or $-s^{(t)}$ (for $t<0$), in analogy to the Willshaw model $p_1^{(t)}$ is called the matrix or memory load for the synaptic weight value $s^{(t)}$. Further the total matrix load $p_1$ is defined as the total fraction of synapses having a non-zero weight value, $$p_1 = \sum_{t=1}^{N} (p_1^{(t)} + p_1^{(-t)}) \quad (3)$$

and correspondingly $p_0 := 1-p_1$ denotes the fraction of silent synapses. See FIG. 5 for an illustration of the discretization procedure.

FIG. 5 exemplarily illustrates the discretization of synaptic strengths by non-linear threshold operations on the synaptic potentials a (see eq. 2). Here a fraction $p_1^{(t)}$ of all synapses obtain strength $s^{(t)}$ corresponding to synaptic potentials in the range $\theta^{(t+1)} > a \geq \theta^{(t)}$ for $0<t \leq N$ or $\theta^{(t-1)} < a \leq \theta^{(t)}$ for $0<t \leq -N$ (assuming $\theta^{(N+1)}=-\theta^{(-N-1)}=\infty$). A fraction $$p_0 := 1 - \sum_{t=1}^{N} (p_1^{(t)} + p_1^{(-t)})$$

of the synapses remains silent with zero strength. Given parameters $p_1^{(t)}, s^{(t)}$ the thresholds $\Theta^{(t)}$ can be computed using eq. 6. Optimal parameters $p_1^{(t)}, s^{(t)}$ can be found, for example, by maximizing eq. 13 (further information is provided below). Some optimal results are shown below (for further results see technical report A. Knoblauch. Zip nets: Neural associative networks with nonlinear learning. Internal Report HRI-EU 09-03, Honda Research Institute Europe GmbH, D-63073 Offenbach/Main, Germany, June 2009).

Network Compression

In a further processing step the network structure can be compressed, or an optimal compression on a digital computer, for example, using Huffman or Golomb coding, the network will require only about $mnI(p_1^{(-N)}, p_1^{(-N+1)}, \ldots, p_1^{(-1)}, p_1^{(1)}, p_1^{(2)}, \ldots, p_1^{(N)})$ bits of computer memory, where I is the Shannon information $$I(p_1^{(-N)}, p_1^{(-N+1)}, \ldots, p_1^{(-1)}, p_1^{(1)}, p_1^{(2)}, \ldots, p_1^{(N)}) := \quad (4)$$
$$-p_0 ld p_0 - \sum_{t=1}^{N} (p_1^{(t)} ld p_1^{(t)} + p_1^{(-t)} ld p_1^{(-t)}).$$

By this procedure the information capacity writes $C^I = C/I$. In the mentioned technical report it is shown that the theoretical bound $C^I = 1$ can be achieved for low entropy synapses with $I \to 0$ or, equivalently, for $p_1 \to 0$. Here the appropriate compression method is Golomb's run-length encoding (cf., e.g., S. W. Golomb. Run-length encodings. IEEE Transactions on Information Theory, 12:399-401, 1966) where the so-called run-length is defined as the number of zero entries between two non-zero entries in the sparse weight matrix. A run-length encoding is used as illustrated by a Table shown in FIG. 6.

Figures 6, 7:
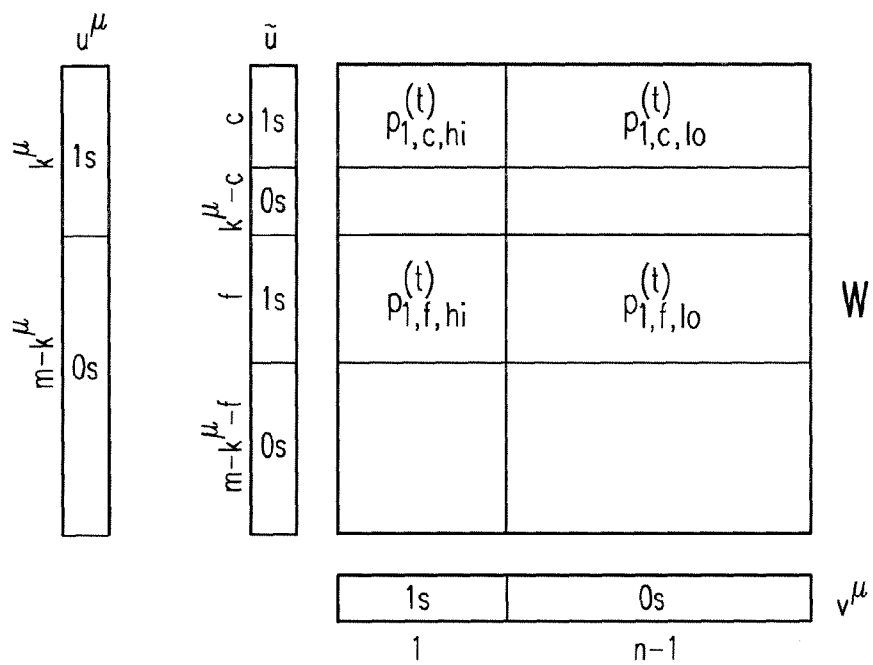
FIG. 6 shows a table with extended Golomb code for representing non-binary weight matrices.
FIG. 7 illustrates a scenario defining regional memory loads $p_1^{(t)}$ of the synaptic weight matrix as necessary for optimizing firing thresholds in order to minimize expected output noise level $\epsilon$.

The table of FIG. 6 shows extended Golomb code for representing non-binary weight matrices. The code consists of the original Golomb codewords coding integer run-lengths for parameters $\mathfrak{M} = 2, 4, 8$ concatenated with a weight code $\mathfrak{W}$. Here the run-length is defined as the number of zero-weights before the next non-zero weight occurs. Then $\mathfrak{W}$ codes the exact value of the non-zero weight, for example $\mathfrak{W} \in \{0, 1\}$ for ternary synapses where 0 may code the negative weight value $-s^{(-1)}$ and 1 may code the positive weight value $s^{(1)}$. Similar is true for larger state numbers. A reasonable choice for the Golomb code parameter is $\mathfrak{M} = 2^{[ld(ln(g_{opt})/ln(1-p_1))]}$ with $g_{opt}=0.513$ (cf., e.g., app. B in A. Knoblauch. On compressing the memory structures of binary neural associative networks. HRI-EU Report 06-02, Honda Research Institute Europe GmbH, D-63073 Offenbach/Main, Germany, April 2006).

For VLSI parallel hardware implementations it is appropriate to prune silent synapses. By this procedure the information capacity writes $C^S = C/p_1$. The mentioned technical report shows that, similarly as for $C^I$, the theoretical bound $C^S = ld\, n$ can be achieved for low entropy synapses with $p_1 \to 0$.

Retrieval

Let $\tilde{u}$ be an input query pattern of dimension m, typically resembling one of the memory address patterns $u^\mu$. For one-step retrieval for each content neuron j the dendritic potential $x_j$, $$x_j = \sum_{i=0}^{m} A_{ij} \tilde{u}_i$$

and the retrieval result $\hat{v}$ is computed by applying a firing threshold $\Theta_j$ to the dendritic potential of content neuron j, $$\hat{v}_j = \begin{cases} 1, & x_j \leq \Theta_j \\ 0, & \text{otherwise} \end{cases}$$

For uncompressed weight matrix A, a retrieval requires $t_{ret}=zn+n \approx zn$ computation steps where $$z := |\tilde{u}| = \sum_{i=1}^{m} \tilde{u}_i$$

is the activity of the input query pattern. For row-wise compressed weight matrix A the retrieval takes only time $$t_{ret} \approx \gamma zn \min(p_1, 1-p_1)$$

where $\gamma$ is a (small) constant required for decompressing the weight matrix.

The retrieval quality can be measured, for example, by the Hamming distance based output noise $\epsilon$ as discussed above (see eq. 1). An alternative quality measure is the signal-to-noise ratio (SNR) defined as $$r := \frac{\mu_{hi} - \mu_{lo}}{\max(\sigma_{lo}, \sigma_{hi})} \quad (5)$$

where $\mu_{hi} := E(x_j | v_j^\mu = 1)$ is the mean dendritic potential of a high-neuron being active in the memory $v^\mu$ to be reactivated. Similarly, $\mu_{lo} := E(x_j | v_j^\mu = 0)$ is the mean dendritic potential of a low-unit being inactive in $v^\mu$. Correspondingly, $\sigma_{lo}$ and $\sigma_{hi}$ are the standard deviations of the dendritic potential distribution of a low-unit and high-unit, respectively. The SNR is a measure how well the dendritic potentials of a high-unit and low-unit are separated. In general, the better the separation the better the retrieval quality. Assuming that the dendritic potential distributions are approximately Gaussian the SNR r is equivalent to the output noise $\epsilon$, i.e., there is a bijective mapping between r and $\epsilon$ (see app. A of the mentioned technical report). The following optimizations of the memory system rely actually on a maximization of the SNR r.

Optimizing System Parameters

It is important to optimize learning parameters $r_1, r_2, r_3, r_4$, and $\theta_j$ in order to maximize retrieval quality and storage capacity. The mentioned technical report describes the theoretical framework for this optimization. The following subsections present the results for implementing the optimal memory system.

Optimizing Synaptic Thresholds $\theta_j$

The synaptic thresholds $\theta_j$ should be chosen such that each content neuron j has the same expected columnar load $$p_1^{(t)}(j) := m^{-1} \sum_{i=1}^{m} 1_{[w_{ij} = s^{(t)}]}$$

for the weight value $s^{(t)}$, where $1_{[C]}$ is one if condition C is true and zero otherwise. Such a choice minimizes $\sigma_{hi}$ and $\sigma_{lo}$ and thus maximizes the SNR eq. 5. In order to obtain a desired set of matrix loads $p_1^{(t)}$ for $t = \pm 1, \pm 2, \ldots, \pm N$, synaptic thresholds $$\theta_j^{(t)} = \begin{cases} \mu_a + G^{c-1}\left(\sum_{t'=t}^{N} p_1^{(t)}\right)\sigma_a, & t = 1, 2, \ldots, N \\ \mu_a - G^{c-1}\left(\sum_{t'=-N}^{t} p_1^{(t)}\right)\sigma_a, & t = -1, -2, \ldots, -N \end{cases} \quad (6)$$

have to be chosen where $\mu_a$ and $\sigma_a$ are the mean and standard deviation of the synaptic potential, and $G^{c-1}$ is the inverse function of the complementary Gaussian distribution function. It is $$\mu_a := (M - M_1)((1-p)r_1 + pr_2) + M_1((1-p)r_3 + pr_4)$$

$$\sigma_a := \sqrt{(M - M_1)p(1-p)(r_2 - r_1)^2 + M_1 p(1-p)(r_4 - r_3)^2}$$

$$G^{c-1}(x) := \sqrt{2}\,\text{erf}^{-1}(1 - 2x) = \sqrt{2}\,\text{erfc}^{-1}(2x)$$

where $$M_1(j) := \sum_{\mu=1}^{M} v_j^\mu$$

is the unit usage of neuron j (which the neuron is assumed to know) and $p := k/m$ and $q := l/n$ are the mean fractions of active address and content neurons. The analysis assumes that the synaptic potentials $a_{ij}$ are approximately Gaussian distributed. This assumption is valid since $a_{ij}$ is the sum of M random variables and M is typically large.

Optimizing Learning Increments $r_1, r_2, r_3, r_4$

We would like to optimize the learning parameters $r_1, r_2, r_3, r_4$ (see FIG. 4) in order to obtain maximal SNR eq. 5. A theoretical analysis presented in the mentioned technical report shows that the SNR becomes maximal if the learning parameters satisfy the following optimality criterion $$\frac{r_1 - r_2}{r_4 - r_3} = \frac{q}{1-q}$$

Note that the optimality criterion can be fulfilled for many different combinations of the learning parameters $r_1, r_2, r_3$, and $r_4$. Examples for optimal learning rules are the covariance rule $$r_1 = pq, \, r_2 = -(1-p)q, \, r_3 = -p(1-q), \, r_4 = (1-p)(1-q)$$

and the homosynaptic rule $$r_1 = 0, \, r_2 = -q, \, r_3 = 0, \, r_4 = 1-q$$

Note that this result is in contrast to the linear learning model where the covariance rule is the unique optimum (cf., e.g., P. Dayan and D. J. Willshaw. Optimising synaptic learning rules in linear associative memory. Biological Cybernetics, 65:253-265, 1991; G. Palm and F. Sommer. Associative data storage and retrieval in neural nets. In E. Domany, J. L. van Hemmen, and K. Schulten, editors, Models of Neural Networks III, pages 79-118. Springer-Verlag, New York, 1996). Note also that employing the homosynaptic rule can reduce learning costs to only Mmnq computation steps compared to Mmn computation steps required for the covariance rule. This is a strong improvement, in particular for applications requiring sparse memory content patterns with $q \to 0$ (also see A. Knoblauch. Best-match hashing with inhibitory associative networks for real-world object recognition. HRI-EU Report 08-05, Honda Research Institute Europe GmbH, 0-63073 Offenbach/Main, Germany, October 2008).

Optimizing Firing Thresholds $\Theta_j$

For retrieval it is also important to optimize firing thresholds $\Theta_j$ in order to minimize expected output noise level $\epsilon$. For large $zp_1(1-p_1) \gg 1$ the dendritic potentials are approximately Gaussian distributed (DeMoivre-Laplace theorem). Then the optimal firing thresholds can be computed from the means and variances of the dendritic potential distributions of low-units and high-units $(\mu_{lo}, \mu_{hi}, \sigma_{lo}^2, \sigma_{hi}^2)$. To this end the input noise is specified by assuming that the input query pattern $\tilde{u}$ contains $c = \lambda k$ correct one-entries from one of the memory address patterns $u^\mu$ and additionally add-noise with $f = \kappa k$ randomly chosen false one-entries ($0 < \lambda \leq 1$, $\kappa \geq 0$). Without loss of generality a scenario can be assumed as illustrated by FIG. 7. In fact, the average difference between a high-potential and low-potential is due to (small) deviations of the regional matrix loads $p_{1,c,lo}^{(t)}, p_{1,c,hi}^{(t)}, p_{1,f,lo}^{(t)}, p_{1,f,hi}^{(t)}$ from the overall matrix loads $p_1^{(t)}$.

In FIG. 7 it is assumed that the $\mu$-th memory address pattern $u^\mu$ contains $k^\mu$ one-entries and $m - k^\mu$ zero-entries. The noisy version $\tilde{u}$ used for the query retrieval contains c correct one-entries and f false one-entries. Then the memory matrix W can be divided into four relevant regions with different memory loads $p_{1,c,lo}^{(t)}, p_{1,c,hi}^{(t)}, p_{1,f,lo}^{(t)}, p_{1,f,hi}^{(t)}$. These memory loads are required for estimating optimal firing thresholds.

Linear approximations of the regional matrix loads are $$p_{1,c,lo}^{(t)} \approx \begin{cases} p_1^{(t)} - \frac{(1-p)(r_1-r_2)}{\sigma_{a,lo}}(g^{(t)} - g^{(t+1)}), & t > 0 \\ p_1^{(t)} + \frac{(1-p)(r_1-r_2)}{\sigma_{a,lo}}(g^{(t)} - g^{(t-1)}), & t < 0 \end{cases}$$

$$p_{1,c,hi}^{(t)} \approx \begin{cases} p_1^{(t)} + \frac{(1-p)(r_4-r_3)}{\sigma_{a,hi}}(g^{(t)} - g^{(t+1)}), & t > 0 \\ p_1^{(t)} - \frac{(1-p)(r_4-r_3)}{\sigma_{a,hi}}(g^{(t)} - g^{(t-1)}), & t < 0 \end{cases}$$

$$p_{1,f,lo}^{(t)} \approx \begin{cases} p_1^{(t)} + \frac{p(r_1-r_2)}{\sigma_{a,lo}}(g^{(t)} - g^{(t+1)}), & t > 0 \\ p_1^{(t)} - \frac{p(r_1-r_2)}{\sigma_{a,lo}}(g^{(t)} - g^{(t-1)}), & t < 0 \end{cases}$$

$$p_{1,f,hi}^{(t)} \approx \begin{cases} p_1^{(t)} - \frac{p(r_4-r_3)}{\sigma_{a,hi}}(g^{(t)} - g^{(t+1)}), & t > 0 \\ p_1^{(t)} + \frac{p(r_4-r_3)}{\sigma_{a,hi}}(g^{(t)} - g^{(t-1)}), & t < 0 \end{cases}$$

assuming $G^{c-1}(p_1)/\sigma_a \to 0$, where $$g^{(t)} := \begin{cases} g\left(G^{c-1}\left(\sum_{t'=t}^{N} p_1^{(t')}\right)\right), & 0 < t \leq N \\ g\left(G^{c-1}\left(\sum_{t'=-N}^{t} p_1^{(t')}\right)\right), & 0 > t \geq -N \\ 0, & \text{otherwise} \end{cases}$$

where $\sigma_{a,lo}$ and $\sigma_{a,hi}$ are the regional standard deviations of the synaptic potentials for high units and low units, respectively, and $G^c$ is the complementary Gaussian distribution function (and $(G^c)^{-1}$ is the inverse of $G^c$). It is $$\sigma_{a,lo} := \sqrt{(M-M_1-1)p(1-p)(r_1-r_2)^2 + M_1 p(1-p)(r_4-r_3)^2}$$

$$\sigma_{a,hi} := \sqrt{(M-M_1)p(1-p)(r_1-r_2)^2 + (M_1-1)p(1-p)(r_4-r_3)^2}$$

$$G^c(x) := \int_x^\infty e^{-t^2/2}/\sqrt{2\Pi}\, dt = \frac{1-\text{erf}(x/\sqrt{2})}{2} = \frac{\text{erfc}(x/\sqrt{2})}{2}$$

where $M_1$ is again the unit usage defined above. From this means and variances of the dendritic potentials can be computed for low-units and high-units. The mean values are $$\mu_{lo} = c\sum_{t=1}^{N}(s^{(t)} p_{1,c,lo}^{(t)} - s^{(-t)} p_{1,c,lo}^{(-t)}) + f\sum_{t=1}^{N}(s^{(t)} p_{1,f,lo}^{(t)} - s^{(-t)} p_{1,f,lo}^{(-t)}). \quad (7)$$

$$\mu_{hi} = c\sum_{t=1}^{N}(s^{(t)} p_{1,c,hi}^{(t)} - s^{(-t)} p_{1,c,hi}^{(-t)}) + f\sum_{t=1}^{N}(s^{(t)} p_{1,f,hi}^{(t)} - s^{(-t)} p_{1,f,hi}^{(-t)}). \quad (8)$$

The variances are $$\sigma_{lo}^2 = c\text{Var}(Q_{c,lo}) + f\text{Var}(Q_{f,lo}) \quad (9)$$

$$\sigma_{hi}^2 = c\text{Var}(Q_{c,hi}) + f\text{Var}(Q_{f,hi}) \quad (10)$$

With $$\text{Var}(Q_{X,Y}) = E(Q_{X,Y}^2) - (E(Q_{X,Y}))^2$$

$$E(Q_{X,Y}) = \sum_{t=1}^{N}(p_{1,X,Y}^{(t)} s^{(t)} - p_{1,X,Y}^{(-t)} s^{(-t)})$$

$$E(Q_{X,Y}^2) = \sum_{t=1}^{N}(p_{1,X,Y}^{(t)} s^{(t)2} - p_{1,X,Y}^{(-t)} s^{(-t)2})$$

Then the optimal firing threshold minimizing output noise $\epsilon$ (eq. 1) solves a quadratic equation having the solution (for details see appendix A in A. Knoblauch. Neural associative networks with incremental learning rules. HRI-EU Report 08-03, Honda Research Institute Europe GmbH, 0-63073 Offenbach/Main, Germany, May 2008)

$$\Theta_{1/2} = \frac{-B \pm \sqrt{B^2 - 4AC}}{2A} \quad (11)$$

$$A = \left(\frac{1}{2\sigma_{hi}^2} - \frac{1}{2\sigma_{lo}^2}\right)$$

$$B = -\left(\frac{\mu_{hi}}{\sigma_{hi}^2} - \frac{\mu_{lo}}{\sigma_{lo}^2}\right)$$

$$C = \log\left(\frac{n-1}{1}\frac{\sigma_{hi}}{\sigma_{lo}}\right) - \frac{1}{2}\left(\frac{\mu_{lo}}{\sigma_{lo}}\right)^2 + \frac{1}{2}\left(\frac{\mu_{hi}}{\sigma_{hi}}\right)^2$$

where the optimal firing threshold is either $\Theta_1$ or $\Theta_2$. In practice the two standard deviations are often approximately equal. In this case, $\sigma_{lo} = \sigma_{hi}$, the optimal firing threshold is uniquely determined by $$\Theta = -\frac{C}{B}. \quad (12)$$

Note that indices j are skipped for brevity. In fact, the optimal firing threshold $\Theta$ of neuron j depends on the unit usage $M_1(j)$.

Optimizing Discretization Parameters $p_1^{(t)}$ and $s^{(t)}$

In our optimization so far the matrix load $p_1$ is still a free parameter (and also the corresponding parameters $p_1^{(t)}$ and $s^{(t)}$. This is in contrast to the Willshaw network where the matrix load is determined by the sparseness parameters p and q. Thus, zip nets can optimize the discretization parameters in order to maximize storage capacities. The relevant storage capacities for zip nets are as follows (also see the mentioned technical report):

1) The pattern capacity defined as the maximal number memories at output noise level $\epsilon$ is $$M_\epsilon \approx \zeta\beta \frac{Pm}{q(1-q)(r_{min}(q,\epsilon))^2} \leq \frac{Pm}{-\Pi q \ln q}$$

With $$\zeta = \frac{\left[\sum_{t=1}^{N}(s^{(t)}(g^{(t)} - g^{(t+1)}) + s^{(-t)}(g^{(-t)} - g^{(-t-1)}))\right]^2}{\text{Var}(Q)} \leq 1 \quad (13)$$

-continued $$E(Q) = \sum_{t=1}^{N} (p_1^{(t)} s^{(t)} - p_1^{(-t)} s^{(-t)})$$

$$E(Q) = \sum_{t=1}^{N} \left( p_1^{(t)} s^{(t)^2} - p_1^{(-t)} s^{(-t)^2} \right)$$

$$\text{Var}(Q) = E(Q^2) - (E(Q))^2$$

$$\beta \approx \frac{\lambda^2}{\lambda + \kappa} \frac{(\rho_1 + \rho_0)^2}{\frac{\rho_1^2}{1-q} + \frac{\rho_0^2}{q}} \leq 1$$

$$r_{min}(q, \varepsilon) \approx$$

$$\begin{cases} G^{c-1}(\varepsilon) + \sqrt{(G^{c-1}(\varepsilon))^2 + 2\ln(1/q - 1)} \approx \sqrt{-2\ln q}, & q \to 0 \\ 2G^{c-1}(\varepsilon/2), & q = 0.5 \end{cases}$$

Here $\zeta \leq 1$ is a function of the discretization parameters. The second variable $\beta \leq 1$ depends on the input noise (first term) and the learning parameters $r_1$, $r_2$, $r_3$, $r_4$ (second term). The input noise term describes the memories' basins of attraction and assumes its maximum one for zero query noise ($\lambda=1$, $\kappa=0$). The second term assumes its maximum one for optimal learning parameters (e.g., covariance or homosynaptic rules) as described above. Finally, $r_{min}(q, \varepsilon)$ is the minimal signal-to-noise ratio required to obtain output noise level $\varepsilon$ for a memory content pattern activity q (cf. FIG. 8). After all, optimizing discretization parameters for maximal pattern capacity requires to maximize $\zeta$.

Figure 8:
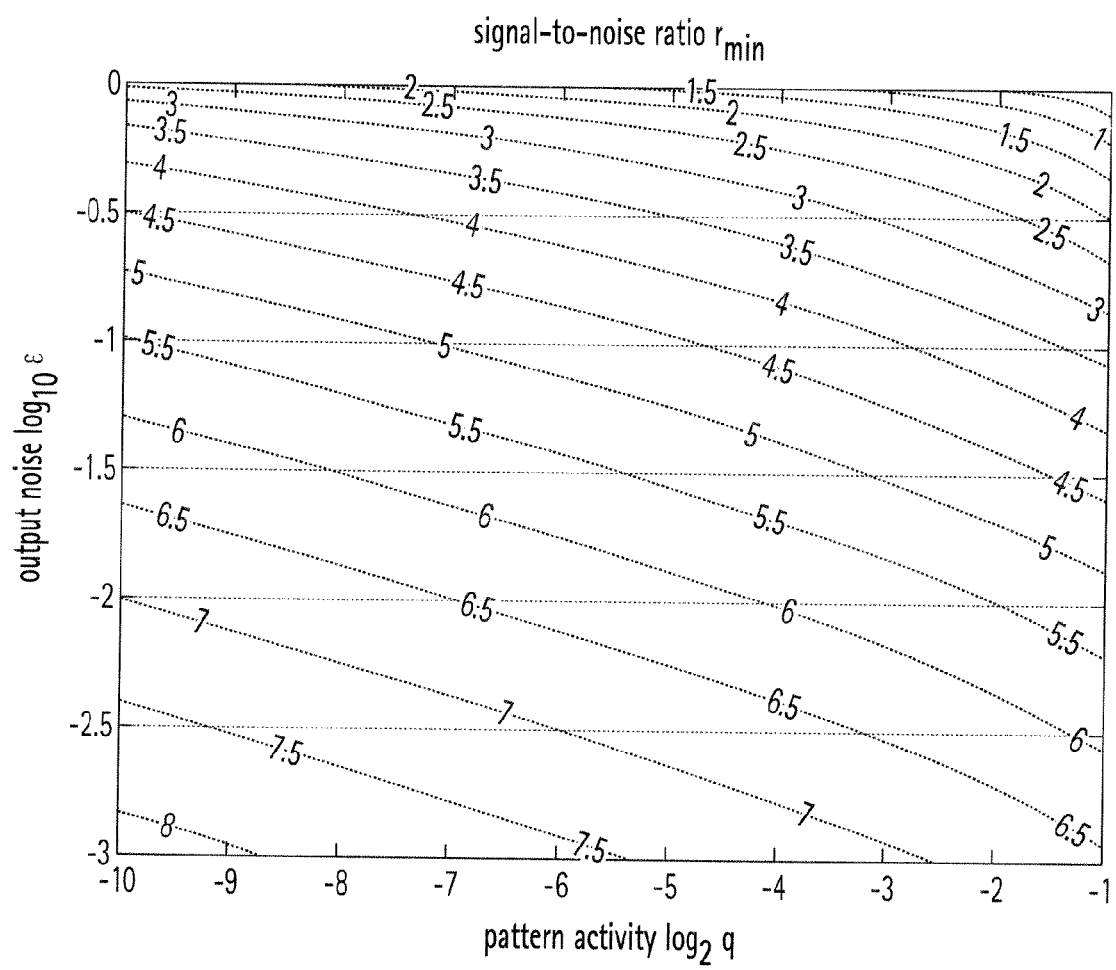
FIG. 8 displays a contour plot of the minimal signal-to-noise.

FIG. 8 displays contour plot of the minimal signal-to-noise ratio $r_{min}$ required to achieve output noise level $\varepsilon$ for memory content patterns having an average fraction q of active neurons. Note the logarithmic scales.

2) The network capacity defined as the stored information per synapse (without network compression) is $$C_\varepsilon := \frac{M_\varepsilon n T(q, p_{01}, p_{10})}{Pmn} \leq \frac{1}{2\ln 2} \approx 0.72 \quad (14)$$

where T is the transinformation (or mutual information) of a binary channel transmitting the memory content pattern components. It is (see also app. B in A. Knoblauch. Neural associative networks with optimal bayesian learning. HRI-EU Report. 09-02, Honda Research institute Europe GmbH, D-63073 Offenbach/Main, Germany, May 2009)

$$P_{01} := pr[x_j \geq \Theta_j \mid v_j^\mu = 0] \approx G^c\left(\frac{\Theta_j - \mu_{lo}(j)}{\sigma_{lo}(j)}\right)$$

$$p_{10} := pr[x_j < \Theta_j \mid v_j^\mu = 1] \approx G^c\left(\frac{\mu_{hi}(j) - \Theta_j}{\sigma_{lo}(j)}\right)$$

$$T(p, p_{01}, p_{10}) := I(p(1-p_{10}) + (1-p)p_{01}) - pI(p_{10}) - (1-p)I(p_{01}).$$

Since $C_\varepsilon$ is essentially proportional to $M_\varepsilon$, $\zeta$ has also to be maximized to obtain maximal network capacity.

3) Then formation capacity for optimal compression of the weight matrix is defined as the stored information per computer bit, $$C_\varepsilon^I := \frac{C_\varepsilon}{I(p_1^{(-N)}, p_1^{(-N+1)}, \ldots, p_1^{(-1)}, p_1^{(1)}, p_1^{(2)}, \ldots, p_1^{(N)})} \leq 1 \quad (15)$$

where I is the Shannon information of a synaptic weight $w_{ij}$ (see eq. 4). Thus, the optimal discretization for maximization of $C^I$ is obtained by maximizing $\zeta/I$.

4) The synaptic capacity for structural compression of the network is $$C_\varepsilon^S := \frac{C_\varepsilon}{p_1} \leq ldn \quad (16)$$

where $p_1$ is the total matrix load eq. 3. Thus, the optimal discretization for maximization of $C^S$ is obtained by maximizing $\zeta/p_1$.

The tables pictured in FIGS. 9-13 present optimal parameter sets maximizing $\zeta$ as required to obtain maximal $M_\varepsilon$ and $C_\varepsilon$. These parameter sets have been computed by applying Matlab function "fminsearch" to the function $-\zeta$ given by eq. 13 (see below for more details). Parameter sets maximizing $C^I$ and $C^S$ can be found in a similar way, but depend on $p_1$. That means, typically one would predefine the total matrix load $p_1 \ll 1$ and then find optimal discretization parameters $p_1^{(t)}$ and $s^{(t)}$ under the constraint $$\sum_{t=1}^{N} (p_1^{(t)} + p_1^{(-t)}) = p_1.$$

Figure 14:
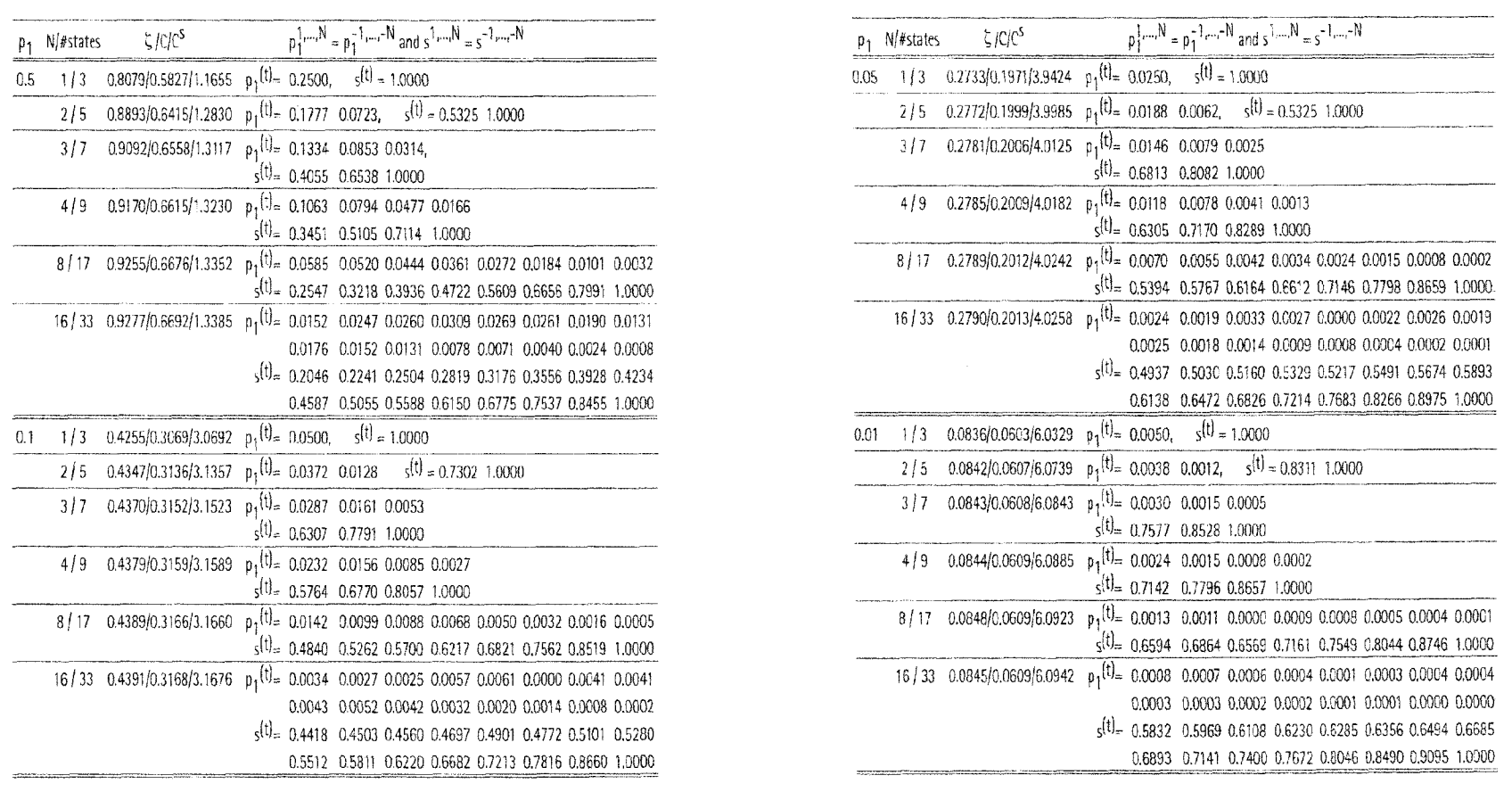

The tables provided in FIGS. 14 and 15 show such parameter sets for $p_1=0.5$, $p_1=0.1$, $p_1=0.05$, and $p_1=0.01$.

FIG. 9 shows a table for optimal parameter sets for zip nets with discrete synapses as obtained from maximizing $\zeta$ with respect to matrix loads $p_1^{(\pm t)}$ and synaptic strengths $s^{(\pm t)}$. The table shows also the faction $$p_0 := 1 - \sum_t (p_1^{(t)} + p_1^{(-t)})$$

of silent synapses and the maximal network capacity $C_{max}\zeta/(2 \ln 2)$ measuring stored information bits per synapse. Here the optimal parameters have been found by applying Matlab function "fminsearch" to the function $-\zeta$ given by eq. 13 using initial parameters $p_1^{(\pm t)}=1/(2N+1)$ and $s^{(\pm t)}=\theta^{(\pm t)}$ assuming $\mu_d/\sigma_a \to 0$ (see eq. 6). Note that results depend indeed on initialization because $\zeta$ has many local maxima at least for $N \geq 3$. The resulting optimal $s^{(\pm t)}$ are normalized to maximal strength one. Note that 4 bit synapses can store about $\zeta \approx 99$ percent of the information a continuous-valued synapse can store.

FIG. 10 shows another table for optimal parameter sets for zip nets with discrete synapses. The table is similar to the table of FIG. 9, but assuming $p_1^{(-t)}=s^{(-t)}=0$ to allow also evaluation of even state numbers. Initial parameters were determined analogously as before. However, to avoid infinite numbers, $$\theta_j^{(t)} := 0.9999 G^{c-1}\left(\sum_{t'=t}^{N} p_1^{(t')}\right)$$

can be chosen with a leading factor of 0.9999. This minor deviation in initial parameters could have caused the significant deviations of results compared to the table of FIG. 9, in particular for larger state numbers. For example, assuming 17 states yields only $\zeta=0.9739$ whereas the corresponding value in the table of FIG. 9 is $=\zeta=0.9913$.

FIG. 11 shows yet another table for optimal parameter sets for zip nets with discrete synapses. The table is similar to the table of FIG. 9, but assuming symmetric "default" parameters with $p_1^{(t)}=p_1^{(-t)}$ and $s^{(t)}=s^{(-t)}$. The results appear slightly better than in the table of FIG. 9.

FIG. 12 shows a further table for optimal parameter sets for zip nets with discrete synapses. Left columns display results for odd state number applying symmetric default parameters as described in the table of FIG. 11. Right columns display results for even state number as described in the table of FIG. 10. Note again that the results for large even state number are worse than for corresponding odd state number because of local minima and insufficient parameter initialization.

Figure 13:
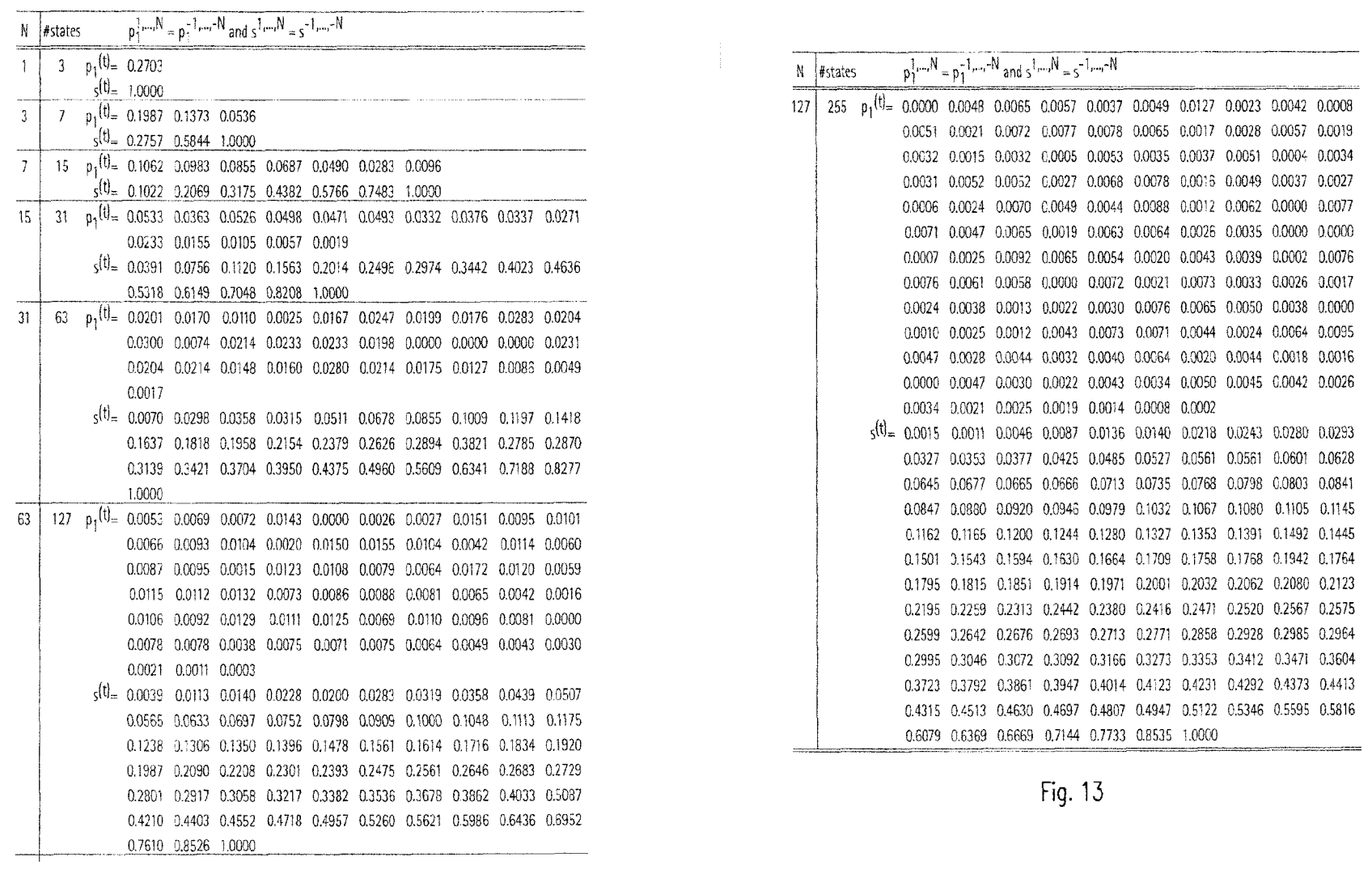

FIG. 13 shows a table for optimal parameter sets $p_1^{(t)}$, $s^{(t)}$ for odd state number applying symmetric default parameters as described in the table of FIG. 11. The data corresponds to left part of the table of FIG. 12.

FIG. 14 shows a table for optimal parameter sets $p_1^{(t)}$, $s^{(t)}$ and corresponding zip variable $\zeta$, network capacity C and synaptic capacity $C^S$ under the constraint of a constant small total matrix load $$p_1 := \sum_{t=1}^{N} (p_1^{(t)} + p_1^{(-t)})$$

required for large $C^T$ and $C_S$. Parameters are computed for odd state numbers applying symmetric default parameters similar as described in the table of FIG. 11. Note that performance gains by increasing the state number become smaller for smaller $p_1$. Note also that the achievable synaptic capacities are smaller than for the Willshaw model which has $C^S=1.3863, 3.5000, 4.4337, 6.6773$ for $p_1=0.5, 0.1, 0.05, 0.01$, respectively.

FIG. 15 shows a table for optimal parameter sets $p_1^{(t)}$, $s^{(t)}$ and corresponding zip variable $\zeta$, network capacity C and synaptic capacity $C^S$ under the constraint of positive synaptic strengths (Dale's law) and a constant small total matrix load $$p_1 := \sum_{t=1}^{N} (p_1^{(t)} + p_1^{(-t)})$$

as required for large $C^I$ and $C^S$. Note that "state number" corresponds to the number of states with positive weights, i.e., the actual state number (including silent synapses) is one larger than suggested by the table. Again the performance gains by increasing state number become smaller for smaller $p_1$. The achievable capacities are smaller than for symmetric default parameters ignoring Dale's law (cf., the table of FIG. 14), and smaller than the Willshaw model's $C^S=1.3863, 3.5000, 4.4337, 6.6773$ for $p_1=0.5, 0.1, 0.05, 0.01$.

Network Variants

In this section network variants based on the optimization principles described in the previous section are described. Although more difficult to analyze, numerical simulations described in the mentioned technical report indicate that these variants can further increase performance.

Synaptic Potentials Equaling the Weights of the Bayesian Associative Network

The synaptic potentials as defined and optimized as described above correspond to synaptic weights of a linear associative memory model. Since the linear associative network is suboptimal for finite network size, a good alternative is to use instead the optimal synaptic weights based on non-linear Bayesian learning (see also A. Knoblauch. Neural associative networks with optimal bayesian learning. HRI-EU Report. 09-02, Honda Research institute Europe GmbH, D-63073 Offenbach/Main, Germany, May 2009). The resulting synaptic potentials are then $$a_{ij} = \log\frac{(M_{11}(1-e_{10}) + M_{01}e_{01})(M_{00}(1-e_{01}) + M_{10}e_{10})}{(M_{10}(1-e_{10}) + M_{00}e_{01})(M_{01}(1-e_{01}) + M_{11}e_{10})} \approx$$
$$\log\frac{M_{11}M_{00}}{M_{10}M_{01}}$$

where $M_{ab}(ij)$ are the synapse usages of the synapse connecting neuron i to neuron j for a, b$\in\{0,1\}$, $$M_{ab}(ij):=\#\{\mu:u_i^\mu=a, v_j^\mu=b\}$$

and $e_{01}(i):=pr[\tilde{u}_i=1|u_i^\mu=0]$ and $e_{10}(i):=pr[\tilde{u}_i=0|u_i^\mu=1]$ are component error probabilities specifying the input noise. If all address neurons i have the same error probabilities $e_{01}=\kappa p/(1-p)$ and $e_{10}=1-\lambda$ they can be expressed in terms of the input noise parameters $\lambda$ and $\kappa$ introduced before (see above). Then still adequate synaptic thresholds have to be found in order to obtain a defined fraction $p_1$ of potentiated synapses. This can be done in analogy to the schema laid out above by computing means and variances of $a_{ij}$ for each content neuron and assuming a Gaussian distribution (also see A. Knoblauch. Neural associative networks with optimal bayesian learning. HRI-EU Report. 09-02, Honda Research Institute Europe GmbH, D-63073 Offenbach/Main, Germany May 2009). Alternatively, it is possible to proceed as described in the next section.

Homeostatic Regulation of Synaptic Thresholds

In the above description synaptic thresholds $\theta_j^{(t)}$ are optimized as a function of the neuron's unit usage $M_1(j)$. There the goal was to make the columnar loads $p_1^{(t)}(j)$ of each content neuron equal to the desired matrix loads $p_1^{(t)}$ (where $t=\pm 1, \pm 2, \ldots, \pm N$). However, computing fixed synaptic thresholds only as a function of the unit usage. $M_1$ may lead to inaccurate results, in particular if the Gaussian approximation of the synaptic potential distribution fails. The latter may happen, for example, in case the memory patterns are not generated at random.

We can easily solve this problem if the neuron has explicit access to its vector of synaptic weights. At least for computer implementations, the synaptic thresholds $\theta_j^{(t)}$ can be adapted in such a way that each content neuron has exactly $[p_1^{(t)}m]$ synapses with strength $s^{(t)}$ where [ . . . ] denotes rounding. In practice this is achieved by sorting the synaptic potentials in descending and ascending order for each content neuron j. For neuron j, let rankdesc(K) be the index of the address neuron with the K-th largest synaptic potential and, similarly, rankasc(K) is the index of the K-th smallest synaptic potential. Then the synaptic thresholds for neuron are determined by $$\theta_j^{(t)} = \begin{cases} a_{rankdesc\left(\left[m\sum_{t'=t}^{N} p_1^{(t')}\right]\right)_j}, & t > 0 \\ a_{rankasc\left(\left[m\sum_{t'=t}^{-N} p_1^{(t')}\right]\right)_j}, & t < 0. \end{cases}$$

If rankdesc(K) is not unique (assuming t>0), for example, if several synapses of neuron j have the same potential, this would mean that more than $[p_1^{(t)}m]$ synapses would obtain strength $s^{(t)}$. In that case the excessive synapses with $a_{ij}=\theta_j^{(t)}$ can be reduced at random, for example, by minimally decreasing their potential $a_{ij}$ (such that their potential is still larger than the next smaller potential). Such a procedure requires that neuron computes first $\theta_1^{(N)}$, then $\theta^{(N-1)}$, and so on. Similar is true for t<0 when rankasc(K) is not unique. Here the potentials of excessive synapses have to be slightly increased assuming that one computes first $\theta_j^{(-N)}$, then $\theta_j^{(-N+1)}$, and so on.

Thus, in the resulting network each content neuron has exactly $[p_1^{(t)}m]$ synapses with strength $s^{(t)}$, and thus the standard deviations of dendritic potentials, $\sigma_{lo}$ and $\sigma_{hi}$ will be minimal. Numerical evaluations indicate that at the same time the mean potential difference $\mu_{hi}-\mu_{lo}$ decreases, but fortunately to a lesser degree than the standard deviations. For this reason the SNR eq. 5 and thus the overall performance will improve (cf., e.g., A. Knoblauch. Zip nets: Neural associative networks with non-linear learning. Internal Report. HRI-EU 09-03, Honda Research Institute Europe GmbH, D-63073 Offenbach/Main, Germany, June 2009).

If the neurons have no direct access toe number of potentiated synapses (as it is likely to be the case for the brain) then the synaptic thresholds may still be regulated by homeostatic mechanisms. Here ongoing background activity can provide a random stimulation. Recurrent inhibition can select the most excited neurons in a winners-take-all fashion. The winning neurons will increase their synaptic thresholds and thus decrease their future activity. As a result, after sufficient time, all neurons will have approximately the same expected dendritic potential for a given random stimulus thus minimizing the variance of the low-potential distribution.

Both approaches, the explicit adjustment of $\theta_j^{(t)}$ and the homeostatic regulation, lead to the problem that the resulting dendritic means and variances are no longer accurately approximated by eqs. 7-10, and thus also the estimated optimal firing thresholds (eqs. 11 and 12) may be inaccurate. One possible solution is to introduce similar homeostatic mechanisms that regulate the firing thresholds. Another simple solution is presented in the next section.

Winners-Take-all Activation of Content Neurons

As described before, for some cases the estimated optimal firing thresholds, eq. 11 or eq. 12, may be inaccurate. If the optimal firing thresholds are unknown then a simple strategy is to activate the I neurons with the highest dendritic potentials $x_j$. Numerical experiments show that this winners-take-all activation can significantly reduce output noise $\epsilon$ and increase storage capacity (cf., e.g., A. Knoblauch. Zip nets: Neural associative networks with nonlinear learning. Internal Report HRI-EU 09-03, Honda Research Institute Europe GmbH, D-63073 Offenbach/Main, Germany, June 2009). In brain-like biological implementations the WTA mechanism can be realized by recurrent inhibition regulating the network activity to a desired level 1.

Note that there are two situations when the 1-WTA retrieval does not improve performance. First, in case the activities of individual memory content patterns $v^\mu$ deviate significantly from the mean activity 1. Then 1-WTA often activates either too many neurons implying high levels of add-noise or too few neurons implying high levels of miss-noise. Second, 1-WTA is problematic for low SNR when the distributions of high and low units have strong overlap such that the 1 mostly excited neurons include much add-noise. Depending on the application it may then be better to activate more than 1 or less than 1 neurons.

Efficient Implementation of Zip Nets with Few-States (e.g., Binary) Synapses

Theory and numerical evaluations show that simple synapses with a small number of states achieve basically the same performance (as evaluated by pattern capacity M and network capacity C) as networks with continuous synapses (see above). For example, zip nets can store up to C=0.46 bits per binary synapse, C=0.58 bits per ternary synapse, C=0.66 per quintiary synapse, C=0.69 per seven-state synapse. For a fifteen-state synapse (which requires less than 4 bits of physical memory) zip nets achieve already C=0.7136 which is about 99 percent of the capacity of the network employing continuous synapses.

Moreover, since $C^I$ scales with the inverse of I, low synaptic entropies corresponding to a small number of states is preferable for implementations on digital computers. This is true not only when evaluating the required computer memory, but also when measuring retrieval time or, equivalently, energy requirements. In particular, for binary synapses the weight matrix W becomes binary, and the corresponding matrix-vector-multiplication $x=W\tilde{u}$ necessary for computing the dendritic potentials x reduces to binary additions and, thus, can be implemented very efficient-, both on standard computers and special hardware.

For example, a compressed implementations of zip nets on standard computers require only $t_{ret} \sim zn\,min(p_1, 1-p_1)$ binary additions per retrieval where $$z := \sum_{i=1}^{m} \tilde{u}_i$$

is the activity of the input query pattern. In contrast, the linear network requires zn (or even mn, cf., e.g., G. Palm and F. Sommer. Associative data storage and retrieval in neural nets. In E. Domany, J. L. van Hemmen, and K. Schulten, editors, Models of Neural Networks III, pages 79-118. Springer-Verlag, New York, 1996) additions of real-valued synaptic weights. Thus, in particular for $p_1 \to 0$ or $p_1 \to 1$, zip nets are much faster and more energy efficient than the linear networks. This argument holds true both for computer implementations as well as for the brain where the energy consumption is dominated by the number of (non-zero) excitatory postsynaptic potentials corresponding to non-silent synapses (also see P. Lennie. The cost of cortical computation. Current Biology, 13493-497, 2003).

At least for relatively small networks there might be a significant computational overhead due to the compression/decompression procedure of the synaptic weight matrix. Here an uncompressed implementation of zip nets may be preferable if the computer architecture provides large integer registers that allow to process many (binary or low-state-number) synapses in parallel. For example, today most standard computers have integer registers of size 64 bit such that (almost) 64 binary synapses can be evaluated in a single computation step as illustrated by FIG. 16.

Figure 16:
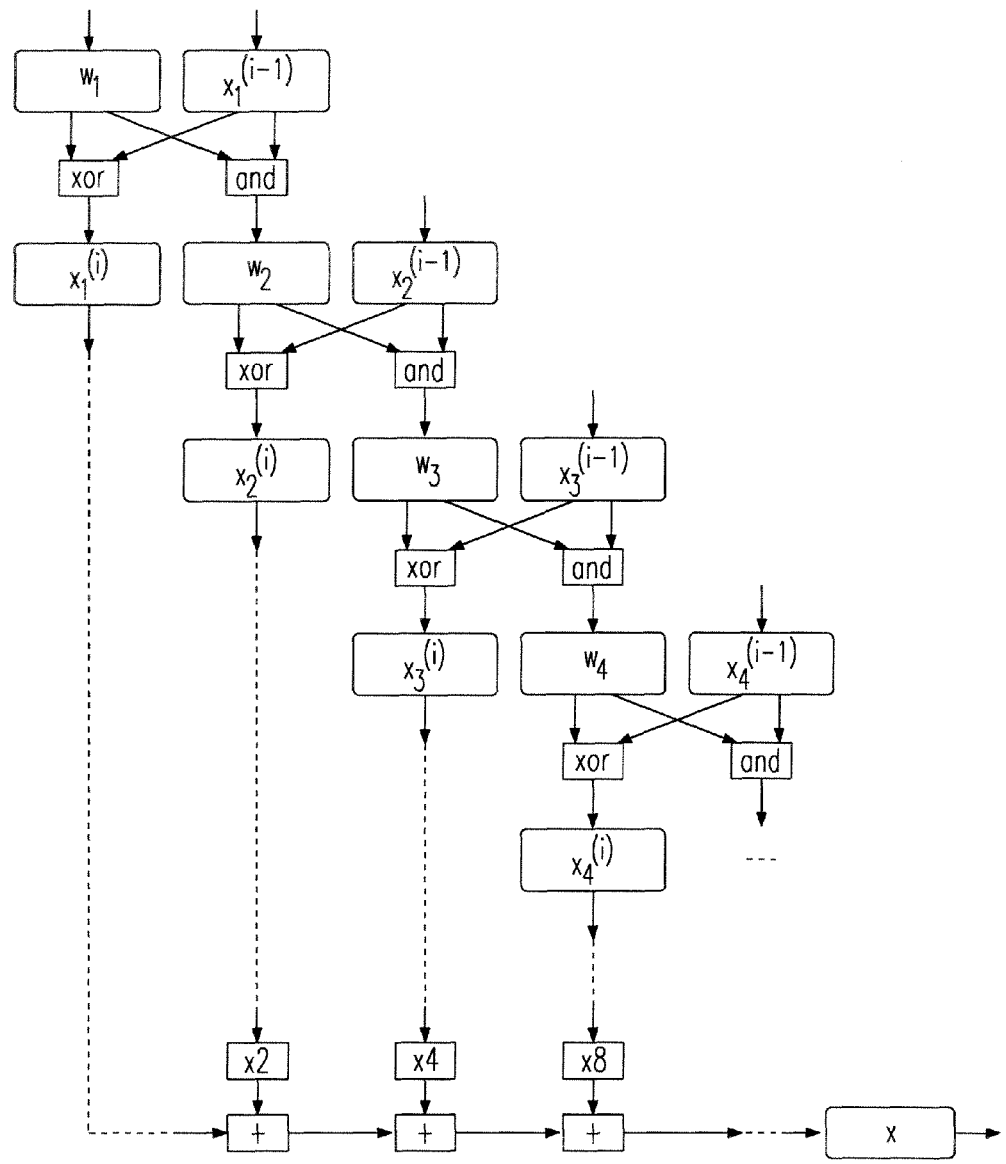
FIG. 16 shows illustrates a processing flow for the fast computation of dendritic potentials.

FIG. 16 illustrates a processing flow for the fast computation of dendritic potentials $x:=W\tilde{u}$ in a binary zip net making use of large integer registers (e.g., 64 bit). For binary queries $\tilde{u}$ the potentials x are essentially the sum of matrix rows i of W that correspond to active query neurons with $\tilde{u}=1$. This can be done in parallel, e.g., making 64 synaptic operations at once. In the flow diagram it is assumed that register $w_1$ contains the matrix row of W (or part of it, e.g., 64 components) corresponding to the i-th active neuron in $\tilde{u}$. Similarly, register $X_1^{(i-1)}$ contains the lowest bits 0 of the sum over all previously added matrix rows (initially it is $x_1^{(i-1)}=0$). By the exclusive-or operation (xor) register $x_3$ (i) will contain the lowest bits 0 of the sum up to the i-th active matrix row. After the and operation register $w_2$ will contain the carry bits of these additions. Similarly, registers and $x_2^{(i-1)}$ and $x_2^{(i)}$ contain the second lowest bits 1 of the sums up to the i−1-th and i-th active matrix row, respectively, and so on. After all active matrix rows have been summed up the vector of dendritic potentials x is obtained by the summation $$x = \sum_{d=0}^{d_{max}} 2^d x_d^{(i)}.$$

Maximal d (i.e., the depth of the processing circuit) is determined by the base-two logarithm of the one-entries of the input query patterns, i.e., $d_{max}=ld\ z$. This processing scheme can be generalized for synapses with more than two states (see above for details).

This allows an efficient parallel implementation of zip nets even on non-parallel standard desktop computers. For such an implementation it is preferable to use a high-entropy regime where the network is incompressible and M and C maximal, e.g., $p_1=0.5$ for binary synapses. Here the achievable information capacity $C^I \approx C$ is always much larger than zero but significantly below the maximum $C^I=1$ which could be obtained for $p_1 \to 0$ or, assuming an inhibitory implementation, also nor $p_1 \to 1$ (see FIG. 17).

Figure 17:
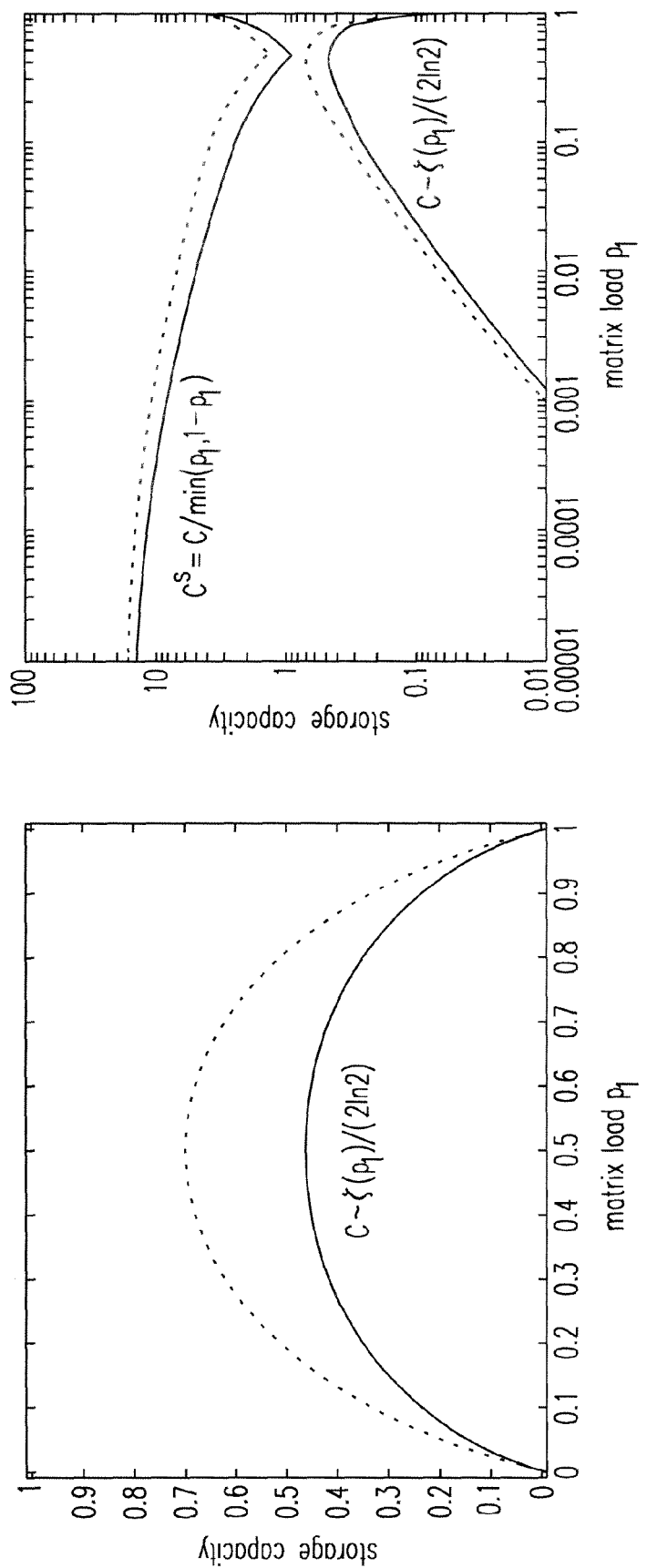
FIG. 17 pictures asymptotic storage capacities as functions of matrix load $p_1$ for binary zip nets and the Willshaw model.

FIG. 17 pictures asymptotic storage capacities as functions of matrix load $p_1$ for binary zip nets (solid lines) and the Willshaw model (dashed lines). The left plot shows network capacity C and information capacity $C^I$. The right plot shows C, $C^I$ and additionally the synaptic capacity employing logarithmic scales. The network capacity C measures bits of stored information per synapse. It is $C \sim \zeta/(2\ ln\ 2) \leq 0.46$ for the z n net (eq. 14) and $C \sim ld\ p_1\ ln\ (1-p1) \leq 0.69$ for the Willshaw model (also see D. J. Willshaw, O. P. Buneman, and H. C. Longuet-Higgins. Non-holographic associative memory. Nature, 222:960-962, 1969; G. Palm. On associative memories. Biological Cybernetics, 36:19-31, 1980; A. Knoblauch, G. Palm, and F. T. Sommer. Memory capacities for synaptic and structural plasticity. Neural Computation, 2009. accepted). In both models C is maximal for $p_1=0.5$. The information capacity $C^I:=C/I\ (p_1) \leq 1$ measures bits of stored information per computer bit (eq. 15) assuming optimal compression of the binary weight matrix. The synaptic capacity $C^S:=C/min.(p_1, 1-p_1)$ measures stored information per non-silent synapse (eq. 16) assuming that irrelevant silent synapses can be pruned by structural plasticity (also see A. Knoblauch. On compressing the memory structures of binary neural associative networks. HRI-EU Report 06-02, Honda Research Institute Europe GmbH, 0-63073 Offenbach/Main, Germany, April 2006; A. Knoblauch. On structural plasticity in neural associative networks. HRI-EU Report 08-04, Honda Research Institute Europe GmbH, 0-63073 Offenbach/Main, Germany, May 2008; A. Knoblauch. The role of structural plasticity and synaptic consolidation for memory and amnesia in a model of cortico-hippocampal interplay. In J. Mayor, N. Ruh, and K. Plunkett, editors, Connectionist Models of Behavior and Cognition II: Proceedings of the 11th Neural Computation and Psychology Workshop, pages 79-90, Singapore, 2009. World Scientific Publishing). $C^I$ and $C^S$ are maximal for $p_1 \to 0$ and $p_1 \to 1$. The latter case assumes an inhibitory implementation (cf., e.g., the above mentioned patent application).

The parallelization method for binary synapses as illustrated by FIG. 16 can be generalized to zip nets with a larger number of synaptic states. In particular, for ternary synapses with discrete weights $-s^{-1}, 0, s^1$ the weight matrix W can be represented by two binary weight matrices $W^{(-1)}$ and $W^{(1)}$ where $w_{ij}^{(-1)}=1$ if $w_{ij}=-s^{(-1)}$ and $w_{ij}^{(1)}=1$ if $w_{ij}=s^{(1)}$. Then computation of the dendritic potentials x can be implemented by first computing $x^{(1)}=W^{(1)}\tilde{u}$ and $x^{(-1)}=W^{(-1)}\tilde{u}$, for example, employing the parallelization method illustrated by FIG. 16, and finally computing $x=s^{(1)}x^{(1)}-s^{(-1)}x^{(-1)}$.

In a similar way, it is possible to efficiently parallelize 4-state synapses with discrete weights $-s^{(-1)}, 0, s^{(1)}-s^{(-1)}, s^{(1)}$ defining $w_{ij}^{(-1)}=1$ if $w_{ij} \in \{-s^{(-1)}, s^{(1)}-s^{(-1)}\}$ and $w_{ij}^{(1)}=1$ if $w_{ij} \in \{s^{(1)}, s^{(1)}-s^{(-1)}\}$.

Generalizing this procedure the implementation of nets can be efficiently parallelized with b-bit synapses having discrete weights from the set $$\left\{\sum_{t'=1}^{b} c_{t'} s^{(t')}: c \in \{0,1\}^b\right\}$$

by representing the weight matrix W by b binary matrices $W^{(t)}$ where t=1, 2, ..., b and $w_{ij}^{(t)}=1$ if $$w_{ij} = \sum_{t=1}^{b} c_t, s^{(t)}$$

and $c_{t'}=1$ for t'=t. Then the dendritic potential can be computed by $$x = \sum_{t=1}^{b} s^{(t)} W^{(t)} \tilde{u}$$

where the vector-matrix multiplications in the sum can again be parallelized as illustrated by FIG. 16. Note that, for this method, zip nets with b-bit synapses require b binary matrices and, thus, have a factor b larger retrieval time (and energy consumption) than binary zip nets. Note also that the $2^b$ discrete weights cannot be chosen arbitrarily. Instead only b discrete weight values can be independently chosen whereas all other discrete weight values are linear sums of these values. Nevertheless, the discretization parameters under such constraints can be optimized in a similar way as described above.

Core of the Invention

The core of the invention is a non-linear synaptic learning device for storing memory associations of the type $u^\mu \to v^\mu$.

Learning happens in three steps. (1) First, a synapse ij learns its potential $a_{ij}$ by adding learning increments $R(u_i^\mu, v_j^\mu)$ for each memory $\mu$. (2) Second, each synaptic potential $a_{ij}$ is mapped to one out of a few discrete values $s(t)$ ($t=\pm 1$, $\pm 2, \ldots, \pm N$) by applying a non-linear operation involving synaptic thresholds $\theta_j^{(t)}$. (3) Third, the discretized synapses may be further compressed depending on the implementation: (3a) For implementations on sequential digital computers the weight matrix can be compressed by applying a Huffman or Golomb-like coding procedure. This procedure is most useful if the synapses have low entropy, i.e., if most synapses have one particular weight value. (3b) For implementations on parallel VLSI hardware the synapses with zero weights can be pruned. This is most useful if the synaptic thresholds are chosen such that many synapses have actually weight zero. (3c) For computers with large integer registers (e.g., of size 64 bit) it may be preferable to choose a high-entropy discretization (where synaptic weights are about equally distributed) and implement query retrieval in a bit-parallel fashion. For example, for binary synapses it is then possible to process 64 synapses in a single computing step. Details of how to implement an optimal memory system are described in the previous sections. This involves, in particular, a description of a system with optimal learning and optimal discretization. The processing flow is illustrated by FIG. 18.

FIG. 18 illustrates a processing flow of the zip network: Upper part: Synaptic learning occurs in three steps: (1) Synaptic potentials $a_{ij}$ are determined by linear summation of the learning increments $r_1$, $r_2$, $r_3$, $r_4$ selected by presynaptic memory activities $u_i^\mu$ and postsynaptic memory activities $v_j^\mu$ ($\mu=1, \ldots, M$) as illustrated by FIG. 4. (2) Discrete synaptic weights $w_{ij} \in \{s^{(1)}, -s^{(-1)}, s^{(2)}, \ldots\}$ are determined by a non-linear threshold operation of synaptic potentials $a_{ij}$. (3) The resulting weight-matrix W is compressed resulting in a compressed representation $W^{cmpr}$. Lower part: Retrieval occurs in three steps: (1) Decompression of relevant parts of $W^{cmpr}$ corresponding to the rows i of W where the input query pattern ũ is active, i.e., $ũ_i=1$. (2) Vector-matrix multiplication of W with the input query pattern ũ yields the vector of dendritic potentials x. (3) Thresholding x with a vector of firing thresholds $\Theta$ yields the retrieval output $\hat{v}$.

Application Areas

Similarly as the Bayesian model, the zip neural associative memory system described in the previous sections are applied in a four-layer neural network for information retrieval which can generally be applied for efficient implementation of nearest neighbor search (see FIG. 19). For example, this system is used for accelerating object recognition systems (see e.g., (H. Wersing and E. Körner. Learning optimized features for hierarchical models of invariant object recognition. Neural Computation, 15:1559-1588, 2003; S. Hasler, H. Wersing, and E. Körner. A comparison of features parts-based object recognition hierarchies. In J. Marques de Sa, L. A. Alexandre, W. Duch, and D. P. Mandic, editors, Proceedings of the 17th international Conference on Artificial Neural Networks (ICANN), Part II, LNCS 4668, pages 210-219, Berlin, Heidelberg, 2007. Springer Verlag; S. Kirstein, H. Wersing, and E. Körner. A biologically motivated visual memory architecture for online learning of objects. Neural Networks, 21(1):65-77, 2008) or any other application based on nearest-neighbor-search on high-dimensional sparse data (see FIG. 20; for more details see A. Knoblauch. On the computational benefits of inhibitory neural associative networks. HRI-EU Report 07-05, Honda Research Institute L. rope GmbH, D-63073 Offenbach/Main, Germany, May 2007, A. Knoblauch. Best-match hashing with inhibitory associative networks for real-world object recognition. HRI-EU Report 08-05, Honda Research Institute Europe GmbH, 0-63073 Offenbach/Main, Germany, October 2008 and the mentioned previous patent application). Here the inhibitory associative network (network IAM in FIGS. 6, 8 of the previous patent application: A. Knoblauch. Method and device for realizing an associative memory based on inhibitory neural networks., 2008. International Patent Application PCT/EP2008/005001, European Patent Application EP 07 110 870.8) was replaced by the zip associative network (see ZAM in FIGS. 19, 20). This can considerably improve retrieval accuracy at the cost of increased memory and/or computation requirements.

FIG. 19 pictures a four-layer system for information retrieval according to one embodiment of the invention. The system is basically identical to a system based on inhibitory associative memory (IAM) proposed in the previous patent application except that the IAM of the previous invention was replaced by the Zip Associative Memory (ZAM) of the current invention. Here memory address patterns $u^\mu$ are mapped to (carefully chosen) index representations $w_1^\mu$ via a ZAM which maps via an error-correcting compressed look-up-table (cLUT) to the memory content patterns $v^\mu$.

FIG. 20 shows a block diagram of a system for visual object recognition using a Zip Associative Memory (ZAM) according to one embodiment of the invention. During learning, images $I^\mu$ are preprocessed in a visual feature hierarchy. The resulting continuous valued feature vector $u^{*\mu}$ is binarized resulting in a binary address vector $u^\mu$ which is associated with the memory content or class label $v^\mu$ employing the four-layer-system described in FIG. 19. During recognition, a test image $\tilde{I}^\mu$ is processed in a similar way. The system (with ZAM replaced by an TAM) is described in detail in the previous patent application.

Further possible applications include efficient implementations of LVQ (Learning Vector Quantization), in particular, if the pattern vectors are high-dimensional and moderately sparse and if a very large number of pattern vectors must be stored.

Similarly, potential applications include efficient implementations of clustering algorithms or self-organizing maps if the number of cluster prototypes is large and the prototype vectors are high-dimensional and moderately sparse.

Another potential application is document retrieval: Here the database may consist of a large set of text documents, for example taken from the internet. Each text document consists of (possibly many) words and can be indexed by selecting a relatively small set of key words. The result is a sparse binary feature vector for each text document. Given a query consisting of a set of key words the task is to find the most relevant documents. This retrieval can be accelerated by the methods proposed here.

A complementary idea is to represent the words in a text document by applying an N-gram code. For example the 1-grams or monograms) of the "memory" are simply the letter "m", "e", "m", "o", "r", "y". Similarly, the 2-grams (or digrams) are "me", "em", "mo", "or", "ry", and the 3-grams are "mem", "emo", "mor", "ory". By that one obtains very naturally a sparse and fault tolerant code already at the word level. For example, for an alphabet of 26 letters, the 2-gram code represents the word "memory" by a binary vector of dimension $26^2=676$ where only 5 components are active. This method can be used, for example, to implement a fault-tolerant code for the keywords described in the previous item. Additionally, the N-gram method can be used to code keyword order and key word sequences in a manner suitable for the associative memory models discussed in this application.

In summary, the zipped neural networks and algorithms proposed in this application can be used for any application involving the best match or nearest-neighbor problem if the underlying pattern vectors are high-dimensional and (moderately) sparse.

It should be understood that the foregoing relates only to embodiments of the present invention and that numerous changes and modifications made therein may be made without departing from the scope of the invention as set forth in the following claims.

LIST OF PRIOR ART REFERENCES

1. A. W. Burks, H. H. Goldstine, and J. von Neumann. Preliminary discussion of the logical design of an electronic computing instrument. Report 1946, U.S. Army Ordonance Department, 1946.
2. P. Dayan and D. J. Willshaw. Optimising synaptic learning rules in linear associative memory. Biological Cybernetics, 65:23-265, 1991.
3. S. W. Golomb. Run-length encodings. IEEE Transactions on Information Theory, 12:399-401, 1966.
4. S. Hasler, H. Wersing, and E. Miner. A comparison of features in parts-based object recognition hierarchies. In J. Marques de Sa, L. A. Alexandre, W. Duch, and D. P. Mandie, editors, Proceedings of the 17th International Conference on Artificial Neural Networks (ICANN), Part II, LNCS 4668, pages 210-219, Berlin, Heidelberg, 2007. Springer Verlag.
5. J. Hertz, A. Krogh, and R. G. Palmer. Introduction to the theory of neural computation. Addison-Wesley, Redwood City, 1991.
6. J. J. Hopfield. Neural networks and physical systems with emergent collective computational abilities. Proceedings of the National Academy of Science, USA, 79:2554-2558, 1982.
7. P. Kanerva. Sparse Distributed Memory. MIT Press, Cambridge, Mass., 1988.
8. S. Kirstein, H. Wersing, and E. Körner. A biologically motivated visual memory architecture for online learning of objects. Neural Networks, 21(1):65-77, 2008.
9. A. Knoblauch. Optimal matrix compression yields storage capacity 1 for binary Willshaw associative memory. In O. Kaynak, E. Alpaydin, E. Oja, and L. Xu, editors, Artificial Neural Networks and Neural information Processing— ICANN/ICONIP 2003., LNCS 2714, pages 325-332. Springer Verlag, Berlin, 2003.
10. A. Knoblauch. On compressing the memory structures of binary neural associative networks. HRI-EU Report 06-02, Honda Research Institute Europe GmbH, 0-63073 Offenbach/Main, Germany, April 2006.
11. A. Knoblauch. On the computational benefits of inhibitory neural associative networks. HRI-EU Report 07-05, Honda Research Institute Europe GmbH, D-63073 Offenbach/Main, Germany, May 2007.
12. A. Knoblauch. Best-match hashing with inhibitory associative networks for real-world object recognition. HRI-EU Report 08-05, Honda Research Institute Europe GmbH, 0-63073 Offenbach/Main, Germany, October 2008.
13. A. Knoblauch. Method and device for realizing an associative memory based on inhibitory neural networks., 2008. International Patent Application PCT/EP2008/005001, European Patent Application EP 07 110 870.8.
14. A. Knoblauch. Neural associative memory and the Willshaw-Palm probability distribution. SIAM Journal on Applied Mathematics, 69(1):169-196, 2008.
15. A. Knoblauch. Neural associative networks with incremental learning rules. HRI-EU Report 08-03, Honda Research Institute Europe GmbH, 0-63073 Offenbach/Main, Germany, May 2008.
16. A. Knoblauch. On structural plasticity in neural associative networks. HRI-EU Report 08-04, Honda Research Institute Europe GmbH, 0-63073 Offenbach/Main, Germany, May 2008.
17. A. Knoblauch. Method and device for realizing a neural associative memory based on optimal Bayesian learning., 2009. European Patent Application, in preparation.
18. A. Knoblauch. Neural associative networks with optimal bayesian learning. HRI-EU Report. 09-02, Honda Research Institute Europe GmbH, D-6=i073 Offenbach/Main, Germany, May 2009.
19. A. Knoblauch. The role of structural plasticity and synaptic consolidation for memory and amnesia in a model of cortico-hippocampal interplay. In J. Mayor, N. Ruh, and K. Plunkett, editors, Connectionist Models of Behavior and Cognition II: Proceedings of the 11th Neural Computation and Psychology Workshop, pages 79-90, Singapore, 2009. World Scientific Publishing.
20. A. Knoblauch. Zip nets: Neural associative networks with non-linear learning. Internal Report HRI-EU 09-03, Honda Research institute Europe GmbH, D-63073 Offenbach/Main, Germany, June 2009.
21. A. Knoblauch, G. Palm, and F. T. Sommer. Memory capacities for synaptic and structural plasticity. Neural Computation, 2009. accepted.
22. T. Kohonen. Associative memory: a system theoretic approach. Springer, Berlin, 1977.
23. P. Lennie. The cost of cortical computation. Current Biology, 13:493-497, 2003.
24. G. Palm. On associative memories. Biological Cybernetics, 36:19-31, 1980.
25. G. Palm. Neural Assemblies. An Alternative Approach to Artificial Intelligence. Springer, Berlin, 1982.
26. G. Palm and F. Sommer. Associative data storage and retrieval in neural nets. In E. Domany, J. L. van Hemmen, and K. Schulten, editors, Models of Neural Networks III, pages 79-118. Springer-Verlag, New York, 1996.
27. K. Steinbuch. Die Lernmatrix. Kybernetik, 1:36-45, 1961.
28. H. Wersing and E. Körner. Learning optimized features for hierarchical models of invariant object recognition. Neural Computation, 15:1559-1588, 2003.
29. D. J. Willshaw, O. P. Buneman, and H. C. Longuet-Higgins. Non-holographic associative memory. Nature, 222:960-962, 1969.

The invention claimed is:
1. A neural associative memory system for maintaining associations between memory address patterns and memory content patterns, the memory system comprising:
   a neural network comprising a set of synapses and a set of neurons, the synapses connecting neurons and storing the associations,
   accepting means for accepting an input query pattern,
   processing means for
      computing a matrix of synaptic potentials as a function of the memory address patterns and the memory content patterns,
      transforming the matrix of synaptic potentials into a matrix of synaptic weights, wherein each weight is chosen from a finite set of synaptic strengths,
      optimizing the neural network with respect to a target architecture chosen for implementation, and computing for each neuron an optimal output function for minimizing output noise, and output means for returning an output pattern to the input query pattern equal or similar to the memory content pattern associated with the memory address pattern equal or similar to the input query pattern.

2. The neural associative memory system of claim 1, wherein said accepting means for accepting an input query pattern is at least one of a sensor, a hardware interface and a software interface.

3. The neural associative memory system of claim 1, wherein the processing means is a processor and/or a signal processing unit formed of hardware and/or software.

4. The neural associative memory system of claim 1, wherein the processing means is adapted for parallel processing.

5. The neural associative memory system of claim 1, wherein the output means is at least one of a hardware interface, or a software interface.

6. The neural associative memory system of claim 1, wherein the neural network is optimized by application of compression mechanisms.

7. The neural associative memory system of claim 1, wherein the neural network is optimized by skipping synapses with a predefined or zero weight in the optimization.

8. The neural associative memory system of claim 1, wherein the output noise is defined the distance between the original content memory pattern and the output generated by the memory system, and wherein parameters are determined through the matrix of synaptic weights and a noise distribution describing how a query input pattern used for retrieval deviates from an original memory address pattern.

9. The neural associative memory system of claim 1, wherein the synaptic potentials are computed as a linear sum of learning increments.

10. The neural associative memory system of claim 1, wherein the synaptic potentials are computed corresponding to the weights of a Bayesian associative memory model.

11. The neural associative memory system of claim 1, wherein the synaptic potentials are transformed into synaptic weights by applying synaptic thresholds yielding discrete synaptic strengths, wherein the synaptic thresholds are computed to minimize the expected number of component errors in the retrieval output.

12. The neural associative memory system of claim 11, wherein the synaptic thresholds are chosen such that each content neuron has the same set of matrix loads defined as an expected fraction of synapses with specified weights.

13. The neural associative memory system of claim 11, wherein the synaptic thresholds are adapted homeostatically such that, at any time, each neuron has the same number of synapses with a predetermined weight.

14. The neural associative memory system of claim 11, wherein discretization parameters are chosen to maximize the signal-to-noise ratio and to maximize the number of storable patterns and/or stored information per synapse.

15. The neural associative memory system of claim 14, wherein the discretization parameters are obtained with respect to the synaptic strength and memory load.

16. The neural associative memory system of claim 14, wherein the discretization parameters are chosen to maximize the information capacity of the neural network, wherein the capacity is defined as the stored information per computer bit.

17. The neural associative memory system of claim 14, wherein the discretization parameters are obtained with respect to the synaptic strength, the memory load, and information content of a discrete synaptic weight.

18. The neural associative memory system of claim 14, wherein the discretization parameters are chosen to maximize the synaptic capacity, wherein the synaptic capacity is defined as the stored information per non-silent synapse.

19. The neural associative memory system of claim 14, wherein the discretization parameters are obtained with respect to the synaptic strength, the memory load and a total matrix load, wherein the total matrix load is defined as the fraction of non-silent synapses.

20. The neural associative memory system of claim 14, wherein the neural network is structurally static.

21. The neural associative memory system of claim 14, wherein the neural network is a structurally plastic network.

22. The neural associative memory system of claim 14, wherein for a set of synapses a discrete synaptic weight matrix is implemented by a set of binary matrices.

23. The neural associative memory system of claim 22, wherein each entry of the binary matrices is defined as a binary weight, which is active if the discrete weight is a linear combination of predetermined factors, wherein the factor corresponding to the binary matrix considered is active.

24. The neural associative memory system of claim 14, wherein synapses have discrete weights, and wherein each discrete weight is calculated as a binary linear combination of values described by a binary bit vector.

25. A method for retrieving a memory content pattern from a neural associative memory system, the method comprising the steps of:

accepting an input query pattern by an accepting means, using a neural network comprising a set of synapses and a set of neurons, the synapses connecting neurons and storing the associations between memory address patterns and memory content patterns for retrieval of an output pattern, computing dendritic potentials from the input query pattern with a synaptic weight matrix by a processing means, computing an output pattern by a non-linear function of the dendritic potentials, parametrized by firing thresholds by the processing means, and returning the output pattern to the input query pattern equal or similar to the memory content pattern associated with the memory address pattern equal or similar to the input query pattern through output means.

26. The method of claim 25, wherein
the accepting means for accepting an input query pattern is at least one of a sensor, a hardware interface and a software interface.

27. The method of claim 25, wherein
the processing means is a processor and/or a signal processing unit formed of hardware and/or software.

28. The method of claim 25, wherein
the processing means is adapted for parallel processing.

29. The method of claim 25, wherein
the output means is at least one of a hardware interface, or a software interface.

30. The method of claim 25, wherein
the processing means is used for
computing a matrix of synaptic potentials as a function of the memory address patterns and the memory content patterns,
transforming the matrix of synaptic potentials into a matrix of discrete synaptic weights, wherein each weight is chosen from a finite set of synaptic strength,
optimizing the neural network with respect to a target architecture chosen for implementation, and
computing for each neuron an optimal output function for minimizing the output noise.

31. The method of claim 25, wherein
the dendritic potentials are computed by a matrix multiplication of the query input pattern with the synaptic weight matrix, and wherein
the output pattern is computed by applying firing thresholds to the dendritic potentials, where the firing thresholds are optimized for minimizing the expected number of component errors in the output pattern if a binary input query pattern is provided.

32. The method of claim 31, wherein
the matrix multiplications are performed bit-parallel.

33. The method of claim 31, wherein
the matrix multiplications are parallelized, such that in each computation step several synapses are processed in parallel.

34. The method of claim 25, wherein
the dendritic potentials are computed by a matrix multiplication of the input query pattern with the synaptic weight matrix, wherein
a vector of firing thresholds is subtracted, if parameters are such that not all resulting firing thresholds are zero or near zero, wherein
the dendritic potentials are normalized, and wherein
the neurons with the largest dendritic potentials are activated.

35. The method of claim 25, wherein
the dendritic potentials are computed for discrete synapses from the synaptic strength, matrices and the input query pattern.

36. A neural network system used in a neural associative memory system of maintaining associations between memory address patterns and memory content patterns, the memory system comprising:
a neural network comprising a set of synapses and a set of neurons, the synapses connecting neurons and storing the associations, accepting means for accepting an input query pattern,
processing means for
computing a matrix of synaptic potentials as a function of the memory address patterns and the memory content patterns,
transforming the matrix of synaptic potentials into a matrix of synaptic weights, wherein each weight is chosen from a finite set of synaptic strengths,
optimizing the neural network with respect to a target architecture chosen for implementation,
computing for each neuron an optimal output function for minimizing output noise,
output means for returning an output pattern to the input query pattern equal or similar to the memory content pattern associated with the memory address pattern equal or similar to the input query pattern, and
further comprising in the method of claim 25, wherein
the neural network comprising a set of synapses and a set of neurons, the synapses connecting neurons and storing the associations between memory address patterns and memory content patterns is implemented on a parallel computational architecture with at least two processors, the processors being connected by a common bus.

37. The neural network of claim 36, wherein
each processor stores a column of a discrete synaptic weight matrix in its local memory, wherein
one processor per neuron is provided, and wherein during retrieval, active components of the input query patterns accepted by an accepting means are presented one after the other on the common bus to neurons implemented by the processors, and wherein
the processors add up corresponding synaptic weights in parallel, such that retrieval requires only as many tune steps as the number of neurons active for the input query pattern.

38. The neural network of claim 36, wherein
the architecture is a matrix like architecture, and wherein
the neurons instantaneously add synaptic inputs such that a retrieval takes only a single time step.

39. The neural network of claim 36, wherein
the accepting means for accepting an input query pattern is at least one of a sensor, a hardware interface and a software interface.

40. A neural associative memory method for maintaining associations between memory address patterns and memory content patterns, the method comprising:
connecting neurons and storing the associations by synapses in a neural network comprising a set of synapses and a set of neurons,
accepting an input query pattern,
computing a matrix of synaptic potentials as a function of the memory address patterns and the memory content patterns,
transforming the matrix of synaptic potentials into a matrix of synaptic weights, wherein each weight is chosen from a finite set of synaptic strengths,
optimizing the neural network with respect to a target architecture chosen for implementation, and
computing for each neuron an optimal output function for minimizing output noise, and
returning an output pattern to the input query pattern equal or similar to the memory content pattern associated with the memory address pattern equal or similar to the input query pattern.

* * * * *